US006584084B1

(12) United States Patent
Barany et al.

(10) Patent No.: US 6,584,084 B1
(45) Date of Patent: Jun. 24, 2003

(54) EXPANDED CARRIER CAPACITY IN A MOBILE COMMUNICATIONS SYSTEM

(75) Inventors: Peter A. Barany, McKinney, TX (US); Eric N. Johnson, Nepean (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/435,523

(22) Filed: Nov. 8, 1999

Related U.S. Application Data

(63) Continuation-in-part of application No. 09/368,217, filed on Aug. 4, 1999, and a continuation-in-part of application No. 09/366,849, filed on Aug. 4, 1999, and a continuation-in-part of application No. 09/368,591, filed on Aug. 4, 1999.
(60) Provisional application No. 60/141,327, filed on Jun. 28, 1999, and provisional application No. 60/122,459, filed on Mar. 1, 1999.

(51) Int. Cl.$^7$ .............................. H04Q 7/00; H04Q 7/20
(52) U.S. Cl. ..................... 370/329; 370/347; 455/450; 455/447; 455/453
(58) Field of Search ................................. 370/329, 330, 370/336, 337, 350; 455/434, 444, 446, 447, 449, 450

(56) References Cited

U.S. PATENT DOCUMENTS

| | | | |
|---|---|---|---|
| 4,723,266 A | | 2/1988 | Perry |
| 5,396,539 A | | 3/1995 | Slekys et al. |
| 5,732,353 A | | 3/1998 | Haartsen |
| 5,768,267 A | * | 6/1998 | Raith et al. ............... 370/329 |
| 5,818,829 A | * | 10/1998 | Raith et al. ............... 370/347 |
| 5,903,552 A | | 5/1999 | Raith |
| 6,032,047 A | * | 2/2000 | Cerwall et al. ........... 455/450 |
| 6,108,550 A | * | 8/2000 | Wiorek et al. ........... 455/447 |
| 6,163,700 A | * | 12/2000 | Hussain et al. .......... 455/453 |
| 6,269,245 B1 | * | 7/2001 | Li et al. .................... 455/450 |

FOREIGN PATENT DOCUMENTS

| WO | WO 95/12936 | 5/1995 |
|---|---|---|
| WO | WO 98/57513 | 5/1998 |

OTHER PUBLICATIONS

Katzela I et al., *Channel Assignment Schemes for Cellular Mobile Telecommunication Systems: A Comprehensive Survey*, IEEE Personal Communications Society, US, vol. 3, NR. 3, pp. 10–31 (Jun. 1996).

Etsi, *Digital Cellular Telecommunications System (Phase 2+); Multiplexing and Multiple Access on the Radio Path (GSM 05.02 Version 6.3.1 Release 1997)*, European Telecommunications Standard EN 300 908, Mar. 1999, pp. 1–52).

Etsi, *En 300 908 Digital Cellular Telecommunications System (Phase 2+); Multiplexing and Multiple Access on the Radio Path (GSM 05.02, Version 6.3.1 Release 1997)*, Mar. 1999, European Telecommunications Standard, Sophia Antipolis, France.

(List continued on next page.)

Primary Examiner—Edward F. Urban
Assistant Examiner—Erika A. Gary

(57) ABSTRACT

A mobile communications system includes a plurality of cell segments each allocated primary carriers to carry circuit-switched traffic and packet data carriers for carrying packet-switched traffic. The packet data carriers include two sets of carriers, a main set of carriers and a secondary set of carriers. The main packet data carriers are allocated to corresponding cell segments. The secondary carriers are allocated to high capacity segments, which may be segments having high bursty traffic or segments in which a hierarchical cell structure is implemented. For high bursty cell segments, the main carriers are used to carry control signaling for performing selection or reselection. However, in such high bursty cell segments, the secondary carriers are not used for performing cell segment selection or reselection.

11 Claims, 22 Drawing Sheets

OTHER PUBLICATIONS

Etsi, *Digital Cellular Telecommunications System (Phase 2+); Mobile Station—Base Station System (Ms–BSS) Interface; Channel Structures and Access Capabilities (GSM 04.03 Version 6.0.0 Release 1997)*, European Telecommunications Standards Institute: TS 100552 V6.0.0 (Aug. 1998), European Telecommunication Standard, Sophia Antipolis, France XP002151907, pp. 1–12.

Peter Rysavy, *Paper: General Packet Radio Service (GPRS)*, Rysavy Research, for PCS Data Today Online Journal, pp. 1–5 (Sep. 30, 1998).

Paul Meche, *UWC–136 RTT Update*, Conference Call, TR45.3/98.04.06.07R4 (TR45/98.03.19R6), Universal Wireless Communications Consortium, pp. 1–5, 177–180, 198, 212–214, and 242–250 (Feb. 26, 1999).

Paul Meche, *Evolution of TDMA to 3G*, Universal Wireless Communications Consortium, pp. 1–19, dated at least as early as Jun. 7, 1999.

*UWC–136: TDMA'S Migration to Third Generation*, Universal Wireless Communications Consortium, pp. 1–2, printed from web site http://uwcc.org/ctiaw98/backg.htm, dated as early as Jun. 6, 1999.

*Universal Wireless Communications Consortium (UWCC) Announces UWC–136, The TDMA IS–136 Solution for Third Generation*, p. 1 (Feb. 23, 1998).

*UWC–136: TDMA'S Evolutionary Path to Third Generation*, Question & Answers, pp. 1–2, dated at least as early as Jun. 6, 1999.

John Scourias, *Overview of the Global System for Mobile Communications*, pp. 1–15, printed from web site http://www.gsmdata.com/overview.htm (Oct. 14, 1997).

*TR 45 TIA/EIA–136–121–A Draft Text*, pp. 1–26, Digital Control Channel Layer 1, (Nov. 20, 1998).

*TR 45 TIA/EIA–136–123–A Draft Text*, pp. i–xii, 1, 45, Digital Control Channel Layer 3, (Nov. 20, 1998).

Nortel Networks, (Peter A. Barany, Eric N. Johnson, Shavantha Kularatna), *UWC–136 Edge Control Channel Options*, UWCC.GTF.PDFG/99.02.09, pp. 1–17 (Feb. 9, 1999).

Nortel Networks, (Peter A. Barany, Eric N. Johnson, Shavantha Kularatna), *Mechanisms for Implementing UWC–136 Edge Control Channels on a 200 KHZ RF Carrier*, UWCC.GTF.PDFG/99.03.09R1, pp. 1–27 (Mar. 9, 1999).

Marc Grant, *PDFG–RF Group Meeting Summary*, UWCC.GTF.PDFG/99.04.13, pp. 1–16 (Apr. 13, 1999).

Nortel Networks, (Peter A. Barany, Eric N. Johnson, Shavantha Kularatna and Shamim Akbar Rahman), *Impact on Maximum Cell Size of Robustness of the GSM SCH Burst Deployed in "Effective" 3/9 and 4/12 Frequency Reuse Patterns with Synchronized UWC–136 Edge 200 KHZ Base Stations*, UWCC.GTF.PDFG/99.04.13.26R2, pp. 1–14 (Apr. 13, 1999).

Nortel Networks, (Peter A. Barany, Eric N. Johnson, Shavantha Kularatna and Shamim Akbar Rahman), *Proposed New Optional Information Element for 30 KHZ DCCH Structure Message and Algorithm for Rapid Acquisition of Edge Compact PFCCH and PSCH*, UWCC.GTF.PDFG/99.05.05, pp. 1–4 (May 5, 1999).

Nortel Networks, (Peter A. Barany, Eric N. Johnson), *Concept Proposal for GPRS–136HS Edge*, ETSI STC SMG2, Revision 1.0, TDoc SMG2 530/99, Agenda Item 4.3, 6.2, 7.2.6.6, pp. 1–22 (May 31–Jun. 4, 1999).

ETSI, *Digital Cellular Telecommunications System (Phase 2+) ; Radio Subsystem Link Control*, GSM 05.08 version 8.0.0, pp. 1–71, Release 1999.

ETSI STC SMG2 EDGE Working Session #10, Bois D'Arcy, France, pp. 1–34 (Jan. 10–14, 2000).

\* cited by examiner

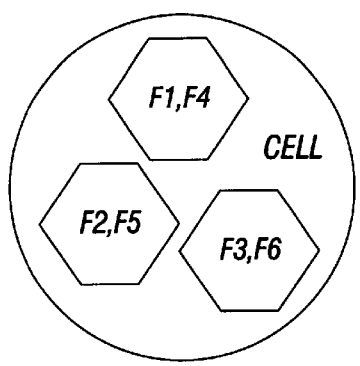
FIG. 4
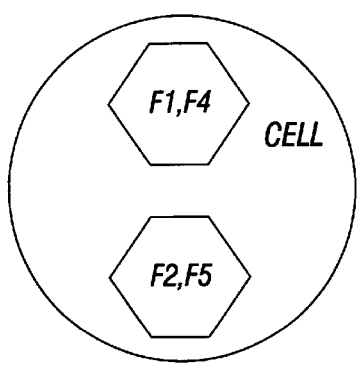 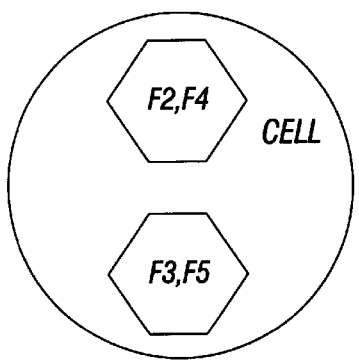 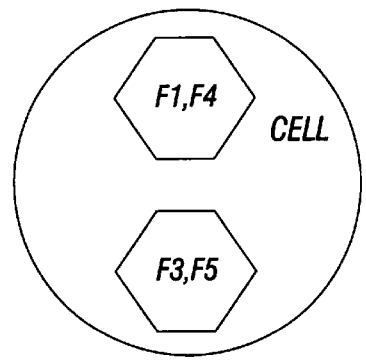
FIG. 5A　　　　FIG. 5B　　　　FIG. 5C
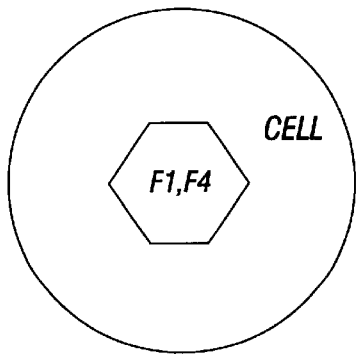 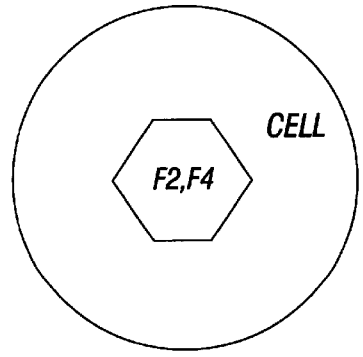 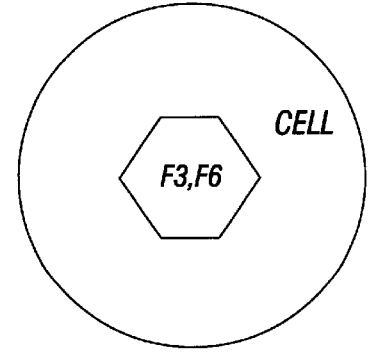
FIG. 6A　　　　FIG. 6B　　　　FIG. 6C

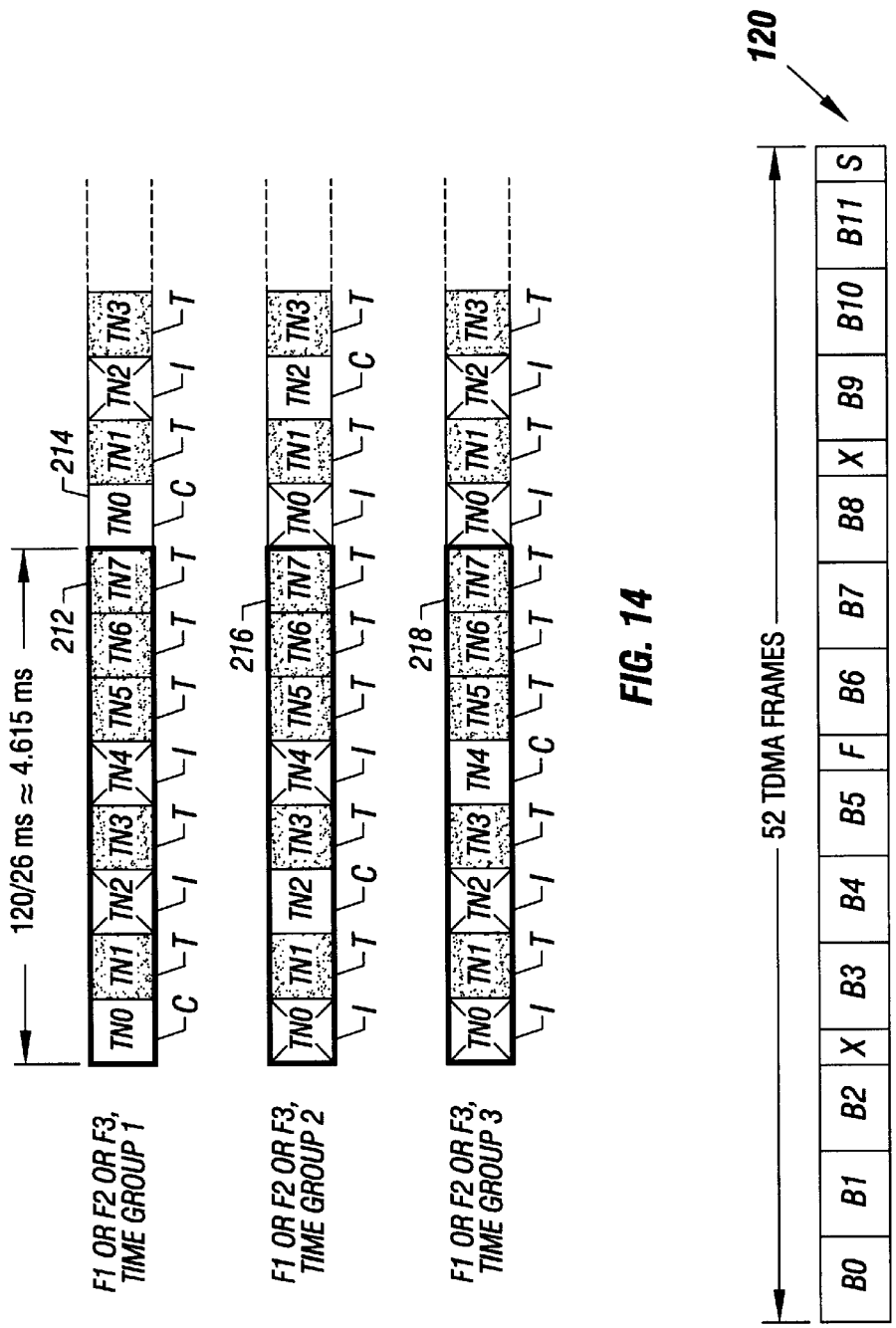

EXPANDED CARRIER CAPACITY IN A MOBILE COMMUNICATIONS SYSTEM

CROSS-REFERENCE TO RELATED APPLICATIONS

This application claims priority under 35 U.S.C §119(c) to U.S. Provisional Application Serial No. 60/141,327, entitled "Mechanism for Evolving the Common Control Channel Capacity of EDGE Compact," filed Jun. 28, 1999; and U.S. Provisional Application Serial No. 60/122,459 entitled "Mechanism for Implementing 136HS Control Channels on a 200 kHz RF Carrier Using a 1/3 Frequency Re-Use pattern, filed Mar. 1, 1999. This application is a continuation-in-part of copending U.S. patent application Ser. No. 09/368,217, entitled "Locating Control Signals in a Mobile Communication System, filed Aug. 4, 1999; U.S. patent application Ser. No. 09/366,849, entitled "Communications of Signaling in a Mobile Communications System with Reduced Interference, "filed Aug. 4, 1999; and U.S. patent application Ser. No. 09/368,591, entitled "Channel Reuse Patterns in a Mobile Communications System," filed Aug. 4, 1999.

BACKGROUND

The invention relates to expanded carrier capacity in a mobile communications system.

Mobile communications systems, such as cellular or personal communications services (PCS) systems, are made up of a plurality of cells. Each cell provides a radio communications center in which a mobile unit establishes a call with another mobile unit or a wireline unit connected to a public switched telephone network (PSTN). Each cell includes a radio base station, with each base station connected to a mobile switching center that controls processing of calls between or among mobile units or mobile units and PSTN units.

From the original advanced mobile phone system (AMPS) standard, additional wireless protocols have been developed and implemented. One such protocol is the time-division multiple access (TDMA) protocol, originally implemented as the IS-54 standard (EIA/TIA/IS-54) and later followed by the TIA/EIA-136 protocol from the Telecommunications Industry Association (TIA). With TIA/EIA-136 TDMA, each channel carries a frame that is divided into six time slots to support up to three mobile units per channel. If half-rate voice coders are used, then each channel may be time shared among up to six mobile units. Other TDMA-based systems include Global System for Mobile (GSM) communications systems, which use a TDMA frame divided into eight time slots (or burst periods).

Traditional speech-oriented wireless systems, such as the TIA/EIA-136 and GSM TDMA systems, utilize circuit-switched connection paths in which a line is occupied for the duration of the connection between a mobile unit and the mobile switching center. Such a connection is optimum for communications that are relatively continuous, such as speech. However, data networks such as local area networks (LANs), wide area networks (WANs), and the Internet use packet-switched connections, in which communication between nodes on a communications link is by data packets. Each node occupies the communications link only for as long as the node needs to send or receive data packets. With the rapid increase in the number of cellular subscribers in conjunction with the rising popularity of communications over data networks, a packet-switched wireless data connection that provides access to the data networks, electronic mail, files in databases, and other types of data has become increasingly desirable.

Several packet-based wireless connection protocols have been proposed to provide more efficient connections between a mobile unit and a data network. One such protocol is the General Packet Radio Service (GPRS) protocol, which complements existing GSM systems. Another technology that builds upon GPRS that has been proposed is the Enhanced GPRS (EGPRS) technology, which offers higher data rates and complements GSM and TIA/EIA-136 TDMA systems.

Because of frequency spectrum limitations, the number of carriers that may be allocated for such packet-based data services in a mobile communications system may be limited. The limited number of carriers may pose a problem in regions having relatively high bursty traffic. A high bursty traffic environment is one in which a relatively high number of call setups and terminations occur during a given time period. This may occur in areas having relatively large amounts of business activity (such as in a metropolitan area) in which many users may be accessing packet-based services with their mobile telephones or other mobile units. High bursty traffic regions are contrasted with normal or low bursty traffic regions, in which relatively low numbers of call setups and terminations occur. An example of such a region is a suburban area, in which fewer calls tend to be made and in which users tend to stay connected for longer periods of time (such as to browse the Internet).

In a high bursty traffic area, the number of control bursts on each carrier may have to be increased compared to the case for normal or low bursty traffic regions to handle the increased volume of control signaling due to call setups and terminations. However, if the number of carriers used for packet-based services are limited, allocating a large number of control bursts to each carrier may reduce the amount of traffic signaling that can be carried by the carrier. This may reduce the bandwidth that is available to users for communicating packet-based traffic, which may result in slower response times.

The limited spectrum allocated for packet-based services also limits the capacity available to users. During peak usage periods, users may experience problems in gaining access to packet-based services in a given cell or cell sector.

Thus, a need exists for increasing the capacity for carrying control and traffic signaling over a packet-based wireless network.

SUMMARY

In general, according to one embodiment, a method of communicating in a mobile communications system having a plurality of cell segments includes providing a first carrier and at least one other carrier in a first cell segment. A plurality of time slots are defined, and at least one of the time slots is allocated during which control signaling is communicated over the first carrier and the at least one other carrier.

In general, according to another embodiment, a method of providing expanded capacity in a first cell segment of a mobile communications system includes providing a first carrier for carrying control signaling in the first cell segment, the control signaling including control signaling for performing cell segment selection. A second carrier is provided for carrying signaling, the signaling not including control signaling for performing cell segment selection.

Some embodiments of the invention may have one or more of the following advantages. In regions in which extra capacity is needed in cell segments, additional carriers may be added to the cell segments within that region, which may be a region having high bursty traffic conditions or a region in which a hierarchical cell structure is desired. Increased capacity allows greater accessibility to a mobile communications system and also improves services provided to users. If extra control signaling is needed, the additional capacity is able to handle such extra control signaling without taking up bandwidth for communicating traffic.

Other features and advantages will become apparent from the following description, from the drawings, and from the claims.

BRIEF DESCRIPTION OF THE DRAWINGS

FIGS. 4, 5A–5C, and 6A–6C illustrate allocation of secondary carriers to cell sectors in accordance with three different arrangements.

FIGS. 12–14 illustrate time-division multiple access (TDMA) frames for carrying data traffic and control signaling in accordance with some embodiments in the packet-switched data link of the mobile communications system of FIG. 1A.

FIG. 15 illustrates a 52-frame multiframe for carrying packet data traffic and control signaling in the system of FIG. 1A.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. Although reference is made to specific numbers of carriers and sectors per cell in the description, other embodiments may employ different numbers of carriers and sectors per cell (or non-sectored cells).

Figure 1A:
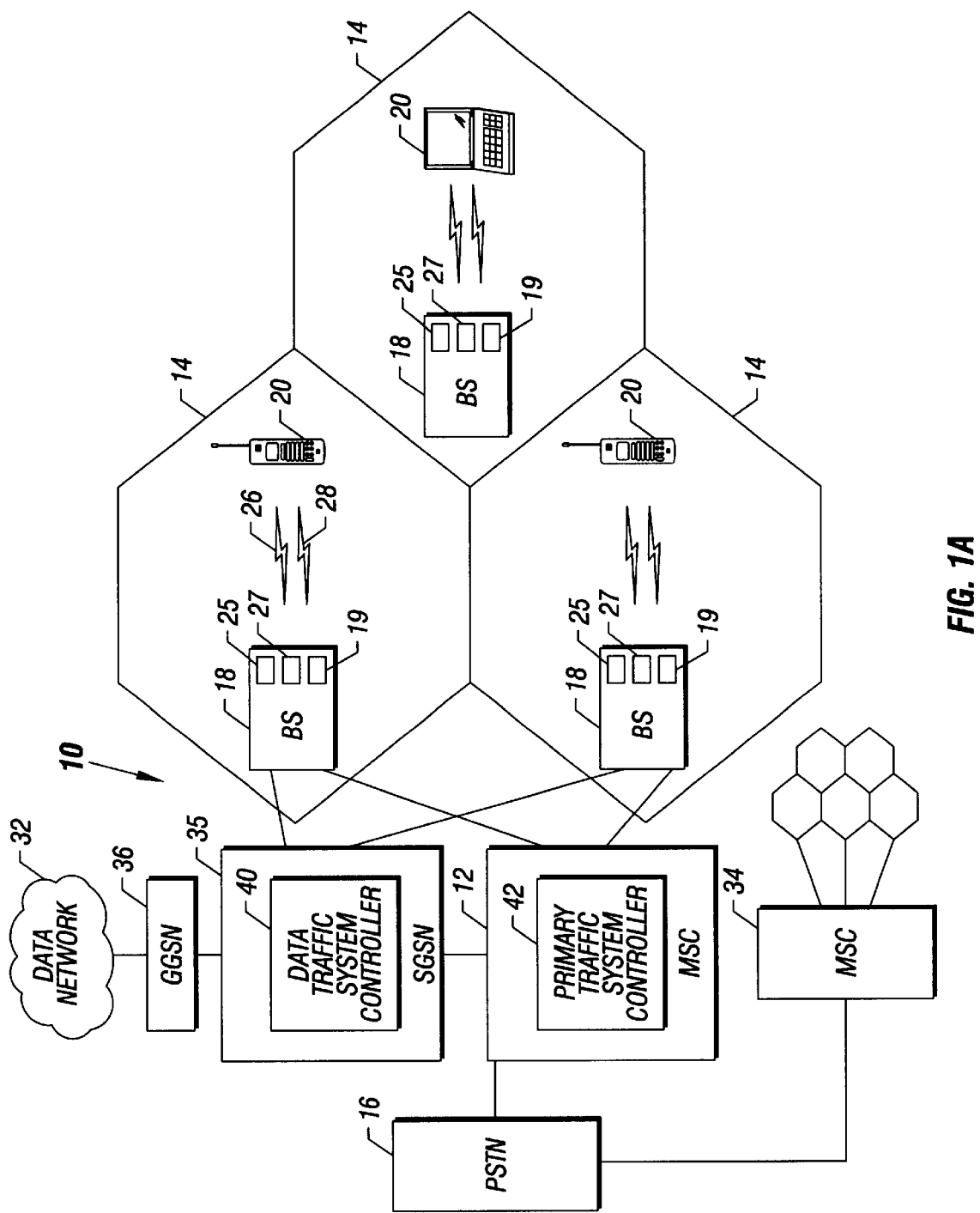
FIG. 1A illustrates an embodiment of a mobile communications system that provides both a circuit-switched traffic link and a packet-switched data link.

Referring to FIG. 1A, a mobile communications system 10, which may be a cellular or a personal communications services (PCS) system, includes a plurality of cells 14 each having a base station 18. The base station 18 is capable of communicating with mobile units 20 (e.g., mobile telephones, mobile computers, or other types of mobile units) over radio frequency (RF) wireless links. The base stations 18 are controlled by a mobile switching center (MSC) 12 for circuit-switched communications. For packet-switched or message-switched communications, the base stations 18 are controlled by a data traffic service node 35. In further embodiments, groups of base stations 18 may be controlled by base station controllers (not shown) that are in turn in communication with the MSC 12 and the data traffic service node 35.

In one embodiment, the base station 18 and mobile units 20 in each cell 14 are capable of communicating over two sets of carriers—a first set of carriers 26 for communicating circuit-switched traffic (e.g., speech data, short messaging services, and other circuit-switched data) and associated control signals; and a second set of carriers 28 (referred to as "packet data carriers") for communicating packet-switched data traffic and associated control signals. As used here, circuit-switched traffic is referred to as primary traffic and packet-switched data traffic is referred to as packet data traffic. Packet data traffic may refer to any traffic that is sent in bursts of messages, packets, or other data units over a link. For example, packet data traffic may be communicated over a data network 32, which may include private networks 32 (e.g., local area networks or wide area networks) as well as public networks (e.g., the Internet). Unlike circuit-switched networks, which provide a dedicated end-to-end connection or physical path for the duration of a call session, a packet-based network is one in which the same path may be shared by several nodes. One popular protocol used for communications over such networks include the Internet Protocol (IP), as described in Request for Comments (RFC) 791, entitled "Internet Protocol," dated September 1981. Other versions of IP, such as IPv6, or other packet-based standards may also be utilized in further embodiments. A version of IPv6 is described in RFC 2460, entitled "Internet Protocol, Version 6 (IPv6) Specification," dated December 1998.

The second set of carriers 28, the base stations 18, and the data traffic service node 35 provide part of the underlying infrastructure for packet-based wireless connections between mobile units 20 and the data network 32. In one embodiment, the packet-based wireless network is an overlay of the primary circuit-switched wireless network.

The primary circuit-switched system may be a time-division multiple access (TDMA) system according to the TIA/EIA-136 protocol from Telecommunications Industry Association). Alternatively, the primary circuit-switched system may be part of a Global System for Mobile (GSM) communications system. The packet data traffic services in one embodiment may be according to the Enhanced General Packet Radio Service (EGPRS) Compact protocol adopted by ETSI (European Telecommunications Standards Institute). However, other protocols for packet-based services may be employed.

Due to limited spectrum availability, the number of channels or carriers employed for packet data services is generally limited (e.g., the three carriers 28 in one embodiment). Deploying packet data services on the relatively small number of channels may be sufficient for some areas, such as areas having normal or low "bursty" traffic conditions. The traffic burstiness of a given area depends on the amount of call setups (to establish a cell) and terminations (to terminate a call) that occur within the area. The larger the number of call setups and terminations, the more bursty the traffic. In a high bursty environment, more control signal bursts on each carrier may be needed to handle the larger number of call setups and terminations. However, allocation of more control signal bursts to a carrier may displace capacity for packet data traffic over the carrier. This reduces the available bandwidth over the wireless packet data link for carrying data traffic. What constitutes high versus normal bursty areas may be defined by an entity serving the communications system, such as a cellular service provider. For example, if a cellular service provider determines that a particular cell segment or group of cell segments is experiencing on a consistent basis high volumes of call setups and terminations that are degrading service to subscribers, the cellular service provider may label these cell segments as high bursty cell segments and add additional packet data carriers (referred to as the secondary group of carriers) to the cell segments. A cell segment may include an entire cell, a cell sector, or some other predefined portion of a cell.

Secondary carriers added to high bursty cell segments may be used to carry both control signaling and traffic signaling. In accordance with one embodiment, each cell segment in a high bursty region can have two groups of packet data carriers 28, a main group and a secondary group. The main group of packet data carriers are used for carrying control and traffic signaling including control signaling involved in selection and reselection of cell segments by a mobile unit, while the secondary group of carriers are used for carrying control signaling and traffic signaling but not control signaling used for selection or reselection. Selection refers to the procedure for selecting a cell segment from a group of neighboring cell segments when a mobile unit initially starts up, while reselection refers to the procedure for re-selecting a new cell segment in response to movement by the mobile unit between cell segments. As used here, the term "selection" is intended to encompass either selection or reselection of cell segments.

In a normal or low bursty traffic cell segment, only the main group of packet data carriers are utilized. In contrast, in a high bursty traffic cell segment, both the main group and secondary group of carriers are used. Thus, in accordance with some embodiments, the mobile communications system 10 may include areas (e.g., high bursty traffic areas) that include cell segments with both main and secondary groups of packet data carriers and other areas including segments with only the main group of packet data carriers.

The secondary carriers may also be used to implement a hierarchical cell structure to expand capacity in a cell segment. A hierarchical cell structure is a multi-layered cell structure that may be used to accommodate capacity needs, provide segmentation of different types of users, and reduce operational power levels and interference. In the hierarchical cell structure, a lower layer of one or more cell segments may operate under the umbrella of a higher layer cell segment. In one arrangement, the lower layer cell segment (s) may operate at a lower radio frequency (RF) signal power than the radio frequency (RF) signal power of the higher layer cell segment. The lower layer cell segment may be referred to as microcell segment, while the higher layer cell segment may be referred to as a macrocell segment. Lower layers of cell segments may be referred to as picocell segments or other designations.

Using the different layers of cell segments, segmentation of different types of users may be possible. For example, users of a public network may access packet-based services at the macrocell layer, whereas users of a private network may access packet-based services at a microcell layer. In addition, the lower layer cell segment(s) may be used to add capacity. One example may be added capacity to handle the increase in call volume during high usage periods (e.g., during rush hour). Thus, the macrocell layer may be set to handle traffic during non-peak periods, while one or more microcell layers may be added to handle increases in traffic during high usage periods. Thus, for example, time delay parameters may be defined to allow mobile units moving at relatively high speeds (e.g., regular car traffic speeds) to select the macrocell layer and not the microcell layer. However, as the speeds of mobile units slow down during peak usage periods, they will be able to select the microcell layer as well as the macrocell layer. Another example of added capacity may be a microcell segment(s) provided in a shopping center. Geographically, a lower layer cell-segment may have the same coverage area or smaller coverage area than a higher layer cell segment. Other arrangements may have other layering schemes.

Layering may be accomplished by adding secondary carriers to a cell segment. Thus, a first layer in the cell segment may include a main carrier. A lower layer in the cell segment may include a secondary carrier. In a hierarchical cell structure, both main and secondary carriers carry control signaling used for selection. This is contrasted to the secondary carrier added to a high bursty cell segment, which does not carry control signaling used for selection.

Figure 2:
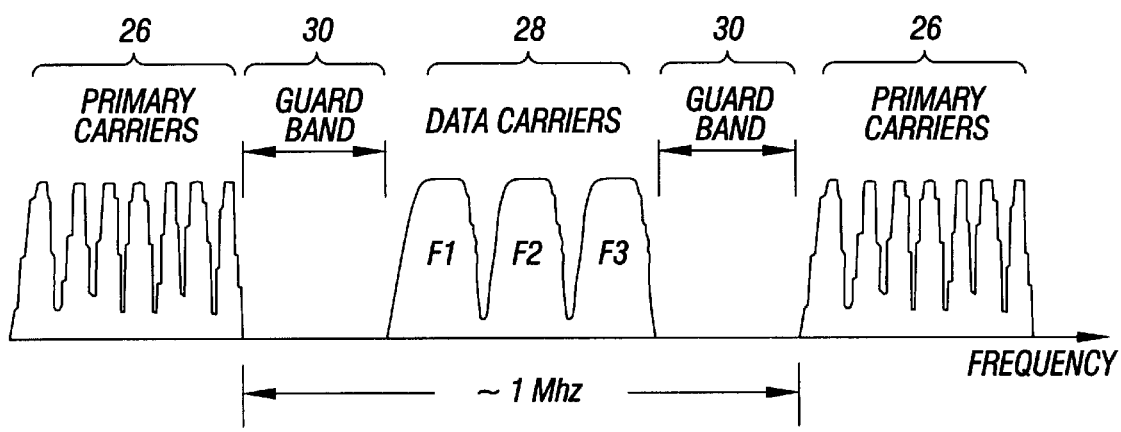
FIG. 2 illustrates main carriers for use in the mobile communications system of FIG. 1A.

Referring further to FIG. 2, according to one embodiment, the base stations 18 include transceivers 25 that send and receive 30-kHz (kilohertz) carriers 26 to carry circuit-switched traffic and associated control signals, e.g., according to the TIA/EIA-136 protocol. In addition, packet data traffic and associated control signals are carried by 200-kHz packet data carriers 28, including a main group of three carriers F1, F2, and F3, which may be provided by transceivers 27 in each base station 18 in the same cell as the 30-kHz carriers. Guard bands 30 are defined between the first set of carriers 26 and the second set of carriers 28. The second set of three 200-kHz carriers 28 and guard bands 30 may be deployed in less than approximately 1 MHz (megahertz) of frequency spectrum in one embodiment.

Figure 3A:
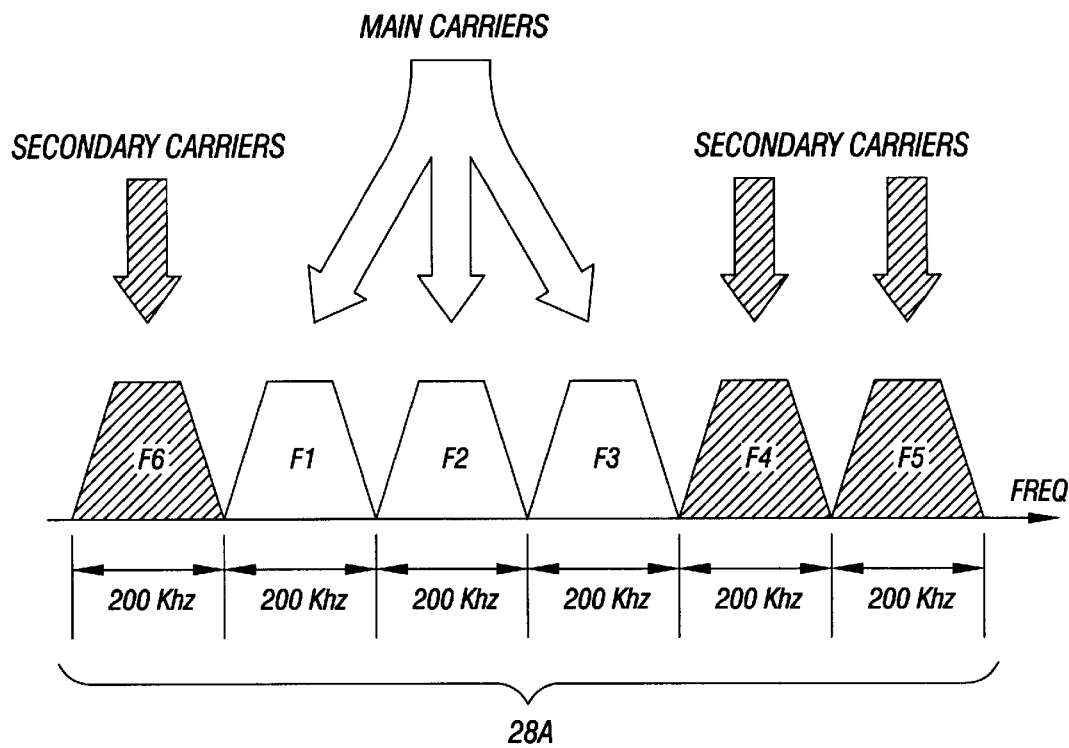
FIGS. 3A and 3B illustrate main carriers and secondary carriers in accordance with one embodiment for use in the mobile communications system of FIG. 1A.

Referring to FIG. 3A, packet data carriers 28A including both main and secondary carriers are illustrated. The carriers 28A include main carriers F1, F2, and F3 and secondary carriers F4, F5, and F6. Primary carriers 26 are assigned frequencies on either side of the secondary carriers 28A. According to one embodiment, each cell may be divided into three sectors, with each cell sector assigned one of the main carriers F1, F2, and F3. In addition, in sectors that are part of high bursty traffic areas or that implement a hierarchical cell structure, an additional one of the secondary carriers F4, F5, and F6 may be added to each cell sector. Such cell sectors are referred to as high capacity sectors. In a given group (e.g., a cell) of cell sectors, several arrangements in allocating the secondary carriers to the cell sectors are possible. In a first arrangement, high bursty traffic conditions or a hierarchical cell structure may be present in three sectors per group. In this arrangement, each of the secondary carriers F4, F5, and F6 is allocated to a corresponding one of the three high capacity sectors. In a second arrangement, two sectors in a group may be high capacity sectors. In the second arrangement, two of the secondary carriers F4, F5, and F6 may be allocated to the two corresponding high capacity sectors. In a third arrangement, one sector per group may be a high bursty capacity sector. In the third arrangement, one of the secondary carriers F4, F5, and F6 may be allocated to the one high capacity sector.

To reduce likelihood of adjacent carrier interference, the secondary carriers F4 and F5 are assigned frequencies above the frequencies of carriers F1, F2, and F3, while the secondary carrier F6 is assigned a frequency below the frequency of the F1 carrier. Such an arrangement provides flexibility in how secondary carriers may be assigned to high capacity sectors without wasting frequency spectrum for guard bands. In an alternative embodiment, the positions of F4, F5, and F6 may be swapped, with F4 and F5 assigned frequencies below F1, and F6 assigned a frequency above F3.

Referring to FIG. 4, in the first arrangement in which a high bursty condition or a hierarchical cell structure is present in three sectors per group, the secondary carrier F4 is allocated to the same cell sector that is allocated the main carrier F1, the secondary carrier F5 is allocated to the cell sector that is allocated the main carrier F2, and the secondary carrier F6 is allocated to the cell sector that is allocated the main carrier F3. It is noted that the main and secondary packet data carriers in each high capacity sector is separated by the width of two channels. In this arrangement, the spectrum taken up by the main and secondary carriers is about 1.2 MHz plus guard bands. In a high capacity sector that is a high bursty sector, the main carrier F1, F2, or F3 carries control signaling used for selection, while the secondary carrier F4, F5, or F6 does not. However, in a high capacity sector that includes a hierarchical cell structure, both the main carrier F1, F2, or F3 and the secondary carrier F4, F5, or F6 carry control signaling used for selection.

Referring to FIGS. 5A–5C, according to an arrangement in which a group has two high capacity sectors, the high capacity sectors with main carriers F1 and F2 (FIG. 5A) or F2 and F3 (FIG. 5B) or F1 and F3 (FIG. 5C) are allocated secondary carriers F4 and F5. As shown in FIG. 5A, the two high capacity sectors having main carriers F1 and F2 are allocated secondary carriers F4 and F5, respectively. Alternatively, as shown in FIG. 5B, the two high capacity sectors having main carriers F2 and F3 may be allocated the secondary carriers F4 and F5, respectively. In another alternative, as shown in FIG. 5C, the two high capacity sectors having main carriers F1 and F3 may be allocated secondary carriers F4 and F5, respectively. As implemented, the main and secondary packet data carriers in each high capacity sector in FIGS. 5A–5C are separated by the width of at least one channel. In this arrangement, the spectrum used is about 1 MHz plus guard bands.

Referring to FIGS. 6A–6C, according to the third arrangement in which a group has one high capacity sector, a high capacity sector with the main carrier F1 (FIG. 6A) or F2 (FIG. 6B) is allocated the secondary carrier F4. However, a high capacity sector with the main carrier F3 (FIG. 6C) is allocated the secondary carrier F6. In this arrangement, the spectrum used is about 0.8 MHz plus guard bands.

It is noted that in each high capacity sector in any of the arrangements noted above, the main carrier and secondary carrier are separated by at least the width of one carrier (200 kHz in one embodiment) to avoid adjacent carrier interference. As a result, guard bands between the main and secondary carriers in a high capacity sector can be avoided to improve spectral efficiency. By arranging secondary carriers with frequencies above and below the frequencies of the main carriers, spectral efficiency in adding a secondary carrier may be achieved even in a group with only one high capacity sector having F1 or F3 (the main carriers on the borders). Thus, with the FIG. 3A carrier arrangement, the secondary carrier F6 may be allocated to the sector having the main carrier F3. Similarly, the secondary carrier F4 may be allocated to the sector having the main carrier F1. If the secondary carrier F6 is not assigned below F1, but instead all three secondary carriers are assigned frequencies above that of the main carrier F3, then some frequency spectrum may be wasted to provide the necessary guard band to avoid adjacent channel interference in allocating a secondary carrier to a high capacity sector with the main carrier F3. For example, F5 may have to be used, which wastes the channel width associated with the carrier F4.

Figure 3B:
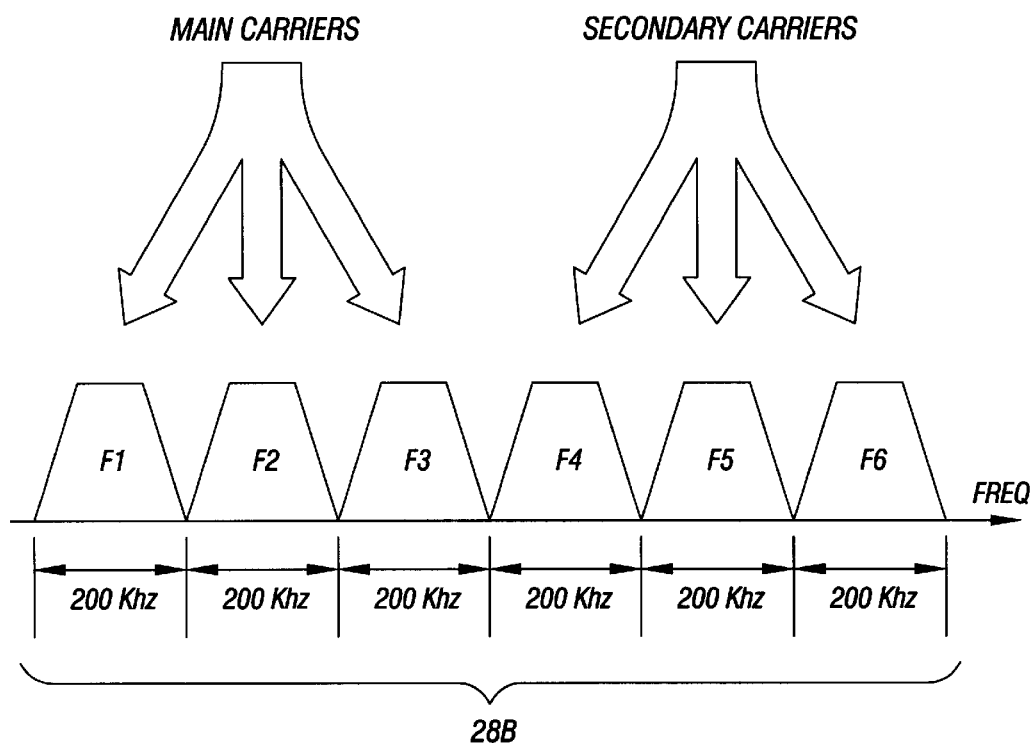

The same spectral efficiency may be achieved with any other frequency allocation scheme in which at least one of the secondary carriers is placed on the other side of the group of main carriers with respect to the remaining secondary carriers. Further, in embodiments in which spectral efficiency is not a concern, the secondary carriers F4, F5, and F6 may be assigned in sequence above or below the main carriers F1, F2, and F3, as illustrated in FIG. 3B, which shows a sequence of packet data carriers 28B. Also, in further embodiments, the main and secondary carriers F1–F6 may be intermingled.

Figure 7:
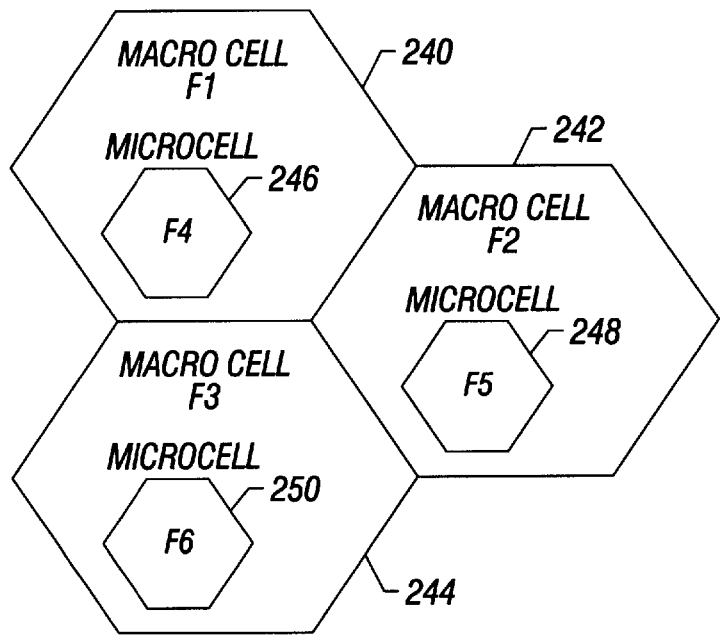
FIG. 7 illustrates a hierarchical cell structure for packet data traffic services in the mobile communications system of FIG. 1A.

Referring to FIG. 7, a hierarchical cell structure is illustrated for a group of three cell sectors 240, 242 and 244. Each cell sector includes multiple layers, with the upper layer referred to as a macrocell sector (240, 242, or 244) and the lower layer referred to as a microcell sector (246, 248 or 250). The macrocell sectors 240, 242 and 244 are associated with main carriers F1, F2 and F3, respectively. The microcell sectors 246, 248 and 250 are associated with secondary carriers F4, F5 and F6, respectively.

Although the above examples include cell sectors that are assigned one main carrier and one secondary carrier, other embodiments may have cell sectors with a plurality of main carriers and one or more secondary carriers.

Referring again to FIG. 1A, the MSC 12 includes a primary traffic system controller 42 that controls the establishment, processing, and termination of circuit-switched calls (e.g., speech, short messages, and so forth) between or among mobile units 20 in one or more cells 14 or between or among mobile units 20 in a cell 14 and a wireline device (e.g., a telephone) coupled to a public switched telephone network (PSTN) 16. More than one MSC (such as an MSC 34 associated with a different cellular service provider) may be included in the mobile communications system 10. Other data traffic service nodes may also be present to provide access to the data network 32 for other mobile units.

The data traffic service node 35 includes a data traffic system controller 40 that controls the establishment, processing, and termination of packet-switched communications. In one embodiment, the data traffic service node 35 may be a serving GPRS support node (SGSN) according to the General Packet Radio Service (GPRS) protocol. Also in accordance with GPRS, the SGSN 35 communicates with a gateway GPRS support node (GGSN) 36, which provides an interface to a data network 32. More generically, the nodes 35 and 36 may include any system or systems that are capable of controlling packet-switched data communications between a mobile unit 20 and the data network 32. Further, the nodes 35 and 36 may be implemented in the same platform as the MSC 12 in an alternative embodiment.

Effectively, two wireless links are provided for mobile units 20 in the cells 14 controlled by the MSC 12: a packet data link, including the carriers 28, the base stations 18, and the data traffic system controller 40, to provide relatively high-speed (up to 384 kbps or higher, for example) packet-switched communications between mobile units 20 and the data network 32; and a primary traffic link, including the carriers 26, the base stations 18, and the primary traffic system controller 42 to provide speech and other circuit-switched communications between mobile units 20 or between a mobile unit 20 and a PSTN unit.

In one example embodiment, the primary traffic system controller 42 controls communications according to the TIA/EIA-136 protocol. In another example, the primary traffic system controller 42 may control communications according to the GSM protocol, which uses 200-kHz carriers, instead of 30-kHz carriers, to carry primary traffic. In the primary traffic link, TDMA frames may be used to carry traffic and control signals. A frame according to TIA/EIA-136 includes six time slots, while a frame according to GSM includes eight time slots. In the packet data link, frames are also defined to carry data traffic and associated control signals. The frame for the packet data link may be similar to a GSM frame with eight time slots (also referred to as burst periods) TN0–TN7 (described further below in connection with FIGS. 12–14).

In the illustrated embodiment, the data traffic system controller 40 and the primary traffic system controller 42 (implementable with software or a combination of software and hardware) may be implemented in separate platforms (the data traffic service node 35 and the MSC 12, respectively). In an alternative embodiment, the system controllers 40 and 42 may be implemented in the same platform. Similarly, transceivers for sending and receiving carriers 26 and 28 may be included in the same base station 18 or in separate base stations.

Figure 8:
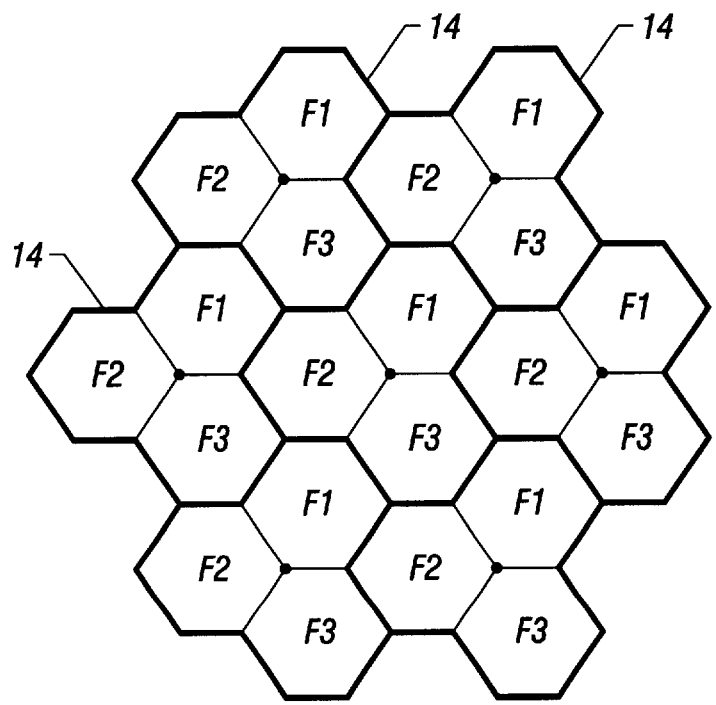
FIG. 8 illustrates a 1/3 channel reuse pattern for packet data traffic communicated over the packet-switched data link in the mobile communications system of FIG. 1A.

In one arrangement, each cell may be divided into three sectors. The primary traffic link may utilize a 7/21 channel reuse pattern, as an example. The frequency reuse distance D for a 7/21 channel reuse pattern is large enough such that the C/I (carrier-to-interference) performance of control channels on the primary traffic link is robust. With the packet data link, however, each base station site is allocated one of three main carrier frequencies F1, F2, and F3 (see also FIG. 2), one per sector, using a 1/3 frequency reuse pattern for data traffic, as illustrated in the tricellular representation of FIG. 8. As is generally known in the art, an equivalent trisector representation may also be used to show the cellular arrangement of FIG. 8.

The one or more sectors in the cluster may also contain secondary carriers F4–F6, if they are needed for high bursty sectors or for creation of a hierarchical cell structure. Data traffic may also be carried by the secondary carriers using the 1/3 frequency reuse pattern.

One main carrier (and perhaps one secondary carrier) is allocated per sector of each cell 14. Data traffic in the packet data link may employ various mechanisms, including link adaptation and incremental redundancy, to provide more robust C/I performance in a 1/3 channel reuse pattern. However, for control signals on the main or secondary packet data carriers, the 1/3 channel reuse pattern is vulnerable to interference because the same frequencies are reused within relatively small distances of each other. A channel reuse plan that employs a small number of channels may cause interference problems due to relatively small distances between cells or cell sectors having the same frequency. In accordance with some embodiments, a higher effective channel reuse plan is created by assigning cells or cell sectors to different combinations of frequencies and time. As a result, a higher effective channel reuse pattern that is based on both frequency and time can be achieved as compared to a reuse plan based only on the available frequencies, such as performed in conventional mobile systems. The higher effective channel reuse pattern, e.g., 3/9, 4/12, and other patterns, may be employed in accordance with some embodiments to provide more robust C/I performance. By creating time groups, control signal bursts may be staggered in time to provide both frequency separation and time separation for higher effective channel reuse patterns.

Figure 9:
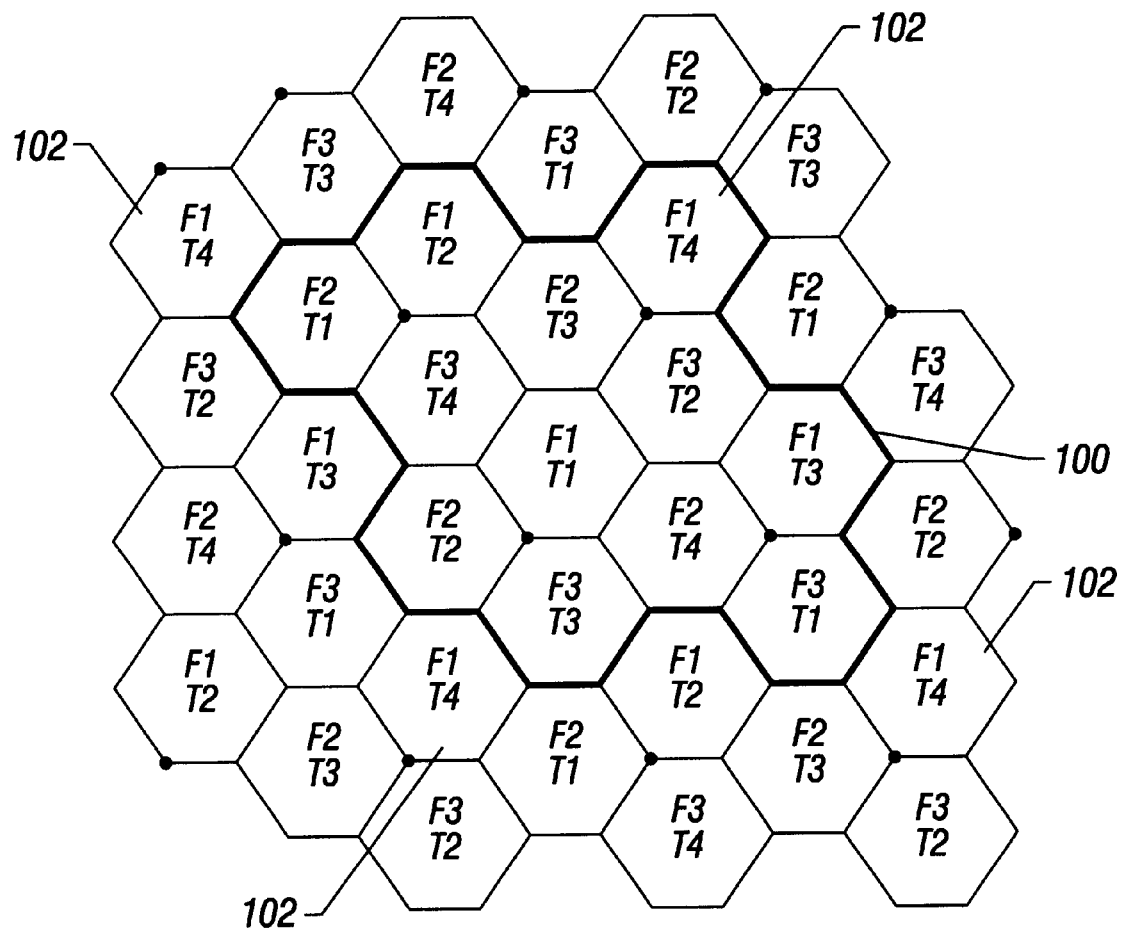
FIGS. 9 and 10 illustrate effective 4/12 and 3/9 channel reuse patterns in accordance with some embodiments that may be employed by the packet-switched data link of the mobile communication system of FIG. 1A.

Referring to FIG. 9, an effective 4/12 channel reuse pattern is illustrated for a cluster of cell sectors that include main carriers F1–F3 but not secondary carriers F4–F6. In the effective 4/12 pattern, four time groups (T1–T4) are created. Thus, in addition to a reuse pattern based on the three main carrier frequencies F1–F3, the reuse pattern also has an orthogonal aspect based on time (T1–T4). Thus, each sector is assigned a frequency Fx as well as a time group Ty. With three frequencies F1, F2, and F3 and four time groups T1, T2, T3, and T4, a cluster 100 of 12 sectors can be defined. The cluster 100 is then repeated to provide the effective 4/12 channel reuse pattern. In effect, time reuse that is added on top of frequency reuse creates a higher effective channel reuse pattern for control channels on the packet data link, thereby creating more robust performance with reduced interference problems.

As illustrated in FIG. 9, a sector having a certain frequency Fx in time group Ty is separated by some distance from another sector having the same frequency Fx and being in the same time group Ty (generally the distance provided by the width and length of each cluster 100). For example, the sectors 102 having frequency F1 and belonging to time group T4 are separated by relatively large distances from each other to reduce the likelihood of interference.

Another advantage offered by the effective 4/12 channel reuse pattern as illustrated in FIG. 9 is that adjacent channel interference is reduced between the main F1 and F2 carriers and the main F2 and F3 carriers. For any given sector having frequency Fx and assigned time group Ty, no adjacent sector is assigned the same time group Ty. For example, the sector 102 is associated with F1 and T4. The sectors adjacent the sector 102 are in one of time groups T1–T3 but not T4. Since adjacent sectors are communicating control channels in different time periods, interference between adjacent main carriers (F1, F2, F3) is reduced. As a result, guard bands do not need to be defined between the main carriers F1, F2, and F3, which allows for reduced frequency spectrum allocation for carriers used to communicate packet data.

Figure 10:
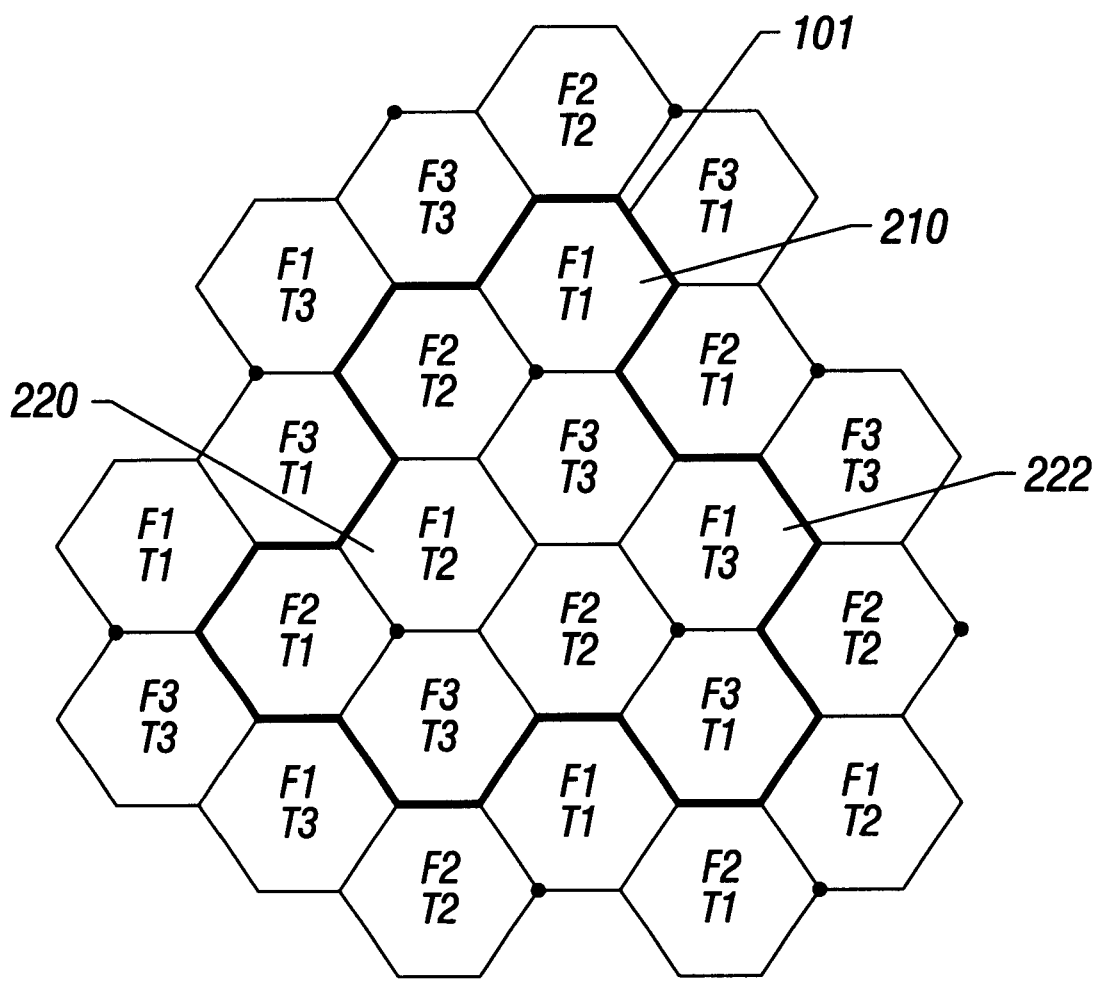

Referring to FIG. 10, an effective 3/9 reuse pattern is illustrated for a cluster 101 including sectors having main carriers F1–F3 but not secondary carriers F4–F6. The effective 3/9 reuse pattern utilizes three time group T1, T2 and T3. This effectively provides a cluster 101 of nine sectors in which each sector has a distinct combination of a frequency Fx and time group Ty. With the effective 3/9 reuse pattern, the reduced adjacent channel interference feature as offered by the effective 4/12 reuse pattern is not available. To reduce interference between adjacent main carriers F1, F2, and F3, guard bands between the carriers may need to be defined.

Figure 11:
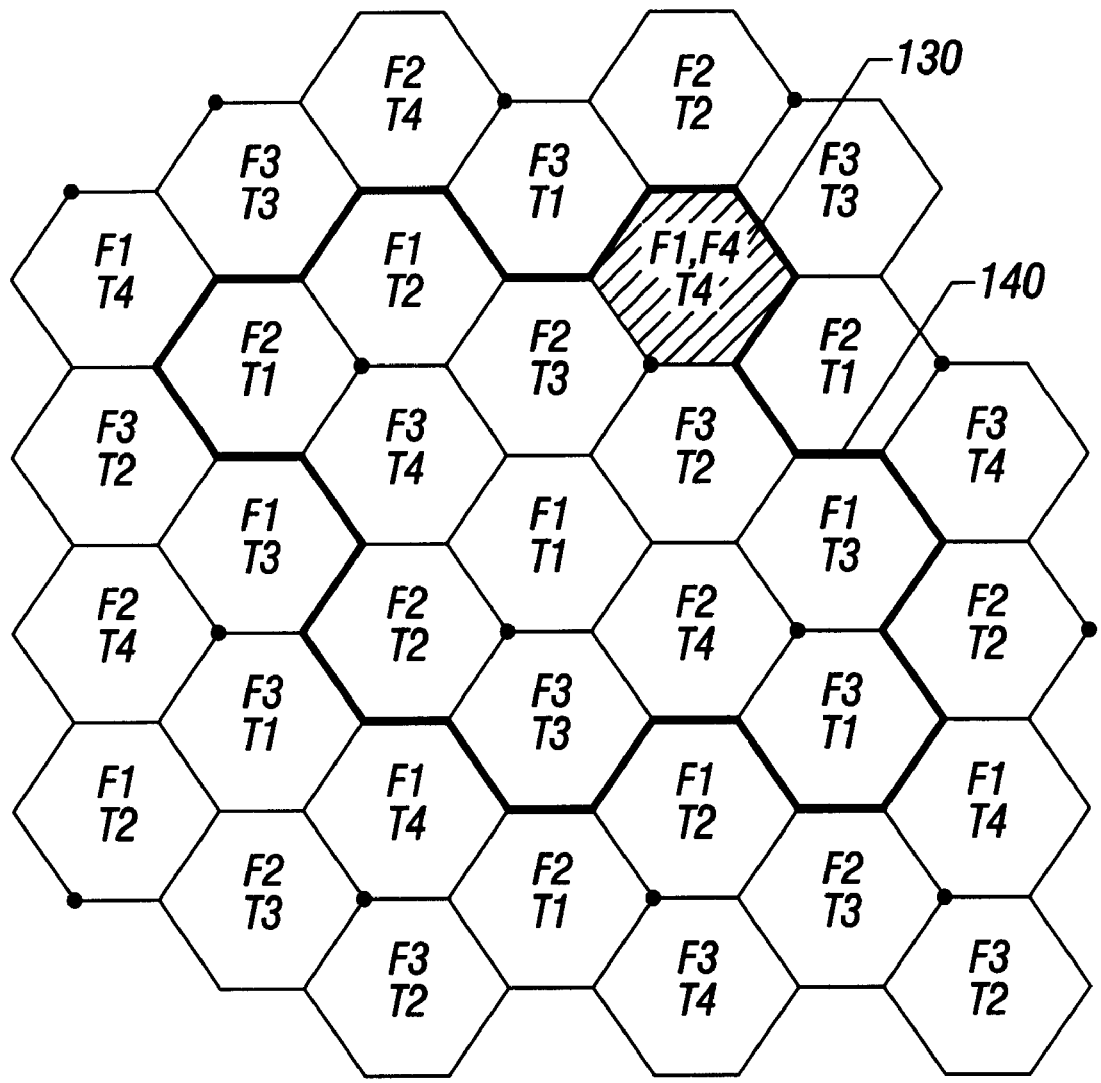
FIG. 11 illustrates allocation of a secondary carrier to a high capacity sector in accordance with an example in the mobile communications system of FIG. 1A.

Referring to FIG. 11, a cluster 140 has an effective 4/12 channel reuse pattern, similar to the one described in connection with FIG. 9. However, the cluster 140 also includes a high capacity sector 130, which is the shaded sector. Thus, in the example shown, the high capacity sector 130 is assigned the main frequency F1 and is in time group T4. In accordance with some embodiments, it is desired to add a secondary carrier to the high capacity sector 130, which may be the secondary carrier F4 (see FIG. 3A). Thus, in the high capacity sector 130, two carriers are present, the main carrier F1 and the secondary carrier F4.

In other examples, additional high capacity sectors may be present in the cluster 140. The higher effective channel reuse patterns may be employed for both main and secondary packet data carriers.

To enable the creation of time groups so that they can be allocated among sectors of each cluster (100, 101, or 130) to provide higher effective channel reuse, the base stations 18 are time synchronized with each other. This may be performed by using a global positioning system (GPS) timing receiver or some other synchronization circuit 19 (FIG. 1A) in each base station 18. Synchronization of the base station 18 is employed to ensure alignment of the time groups in the cell sectors. Base station synchronization is carried out such that the following two criteria are satisfied. TDMA frames (including time slots TN0–TN7) of the packet data link are aligned with each other in all sectors. Thus, time slot TN0 occurs at the same time at each base station site in each sector, to within tolerances of the synchronization equipment and any differences in propagation delays. Further, according to one embodiment, the control and traffic channels of the data link are carried by a multiframe structure (discussed further below in connection with FIGS. 15–17). Each multiframe structure starts with frame 0 and continues to frame NN (e.g., 50 or 51). When time synchronized, frame 0 occurs at the same time in each sector.

Figure 1B:
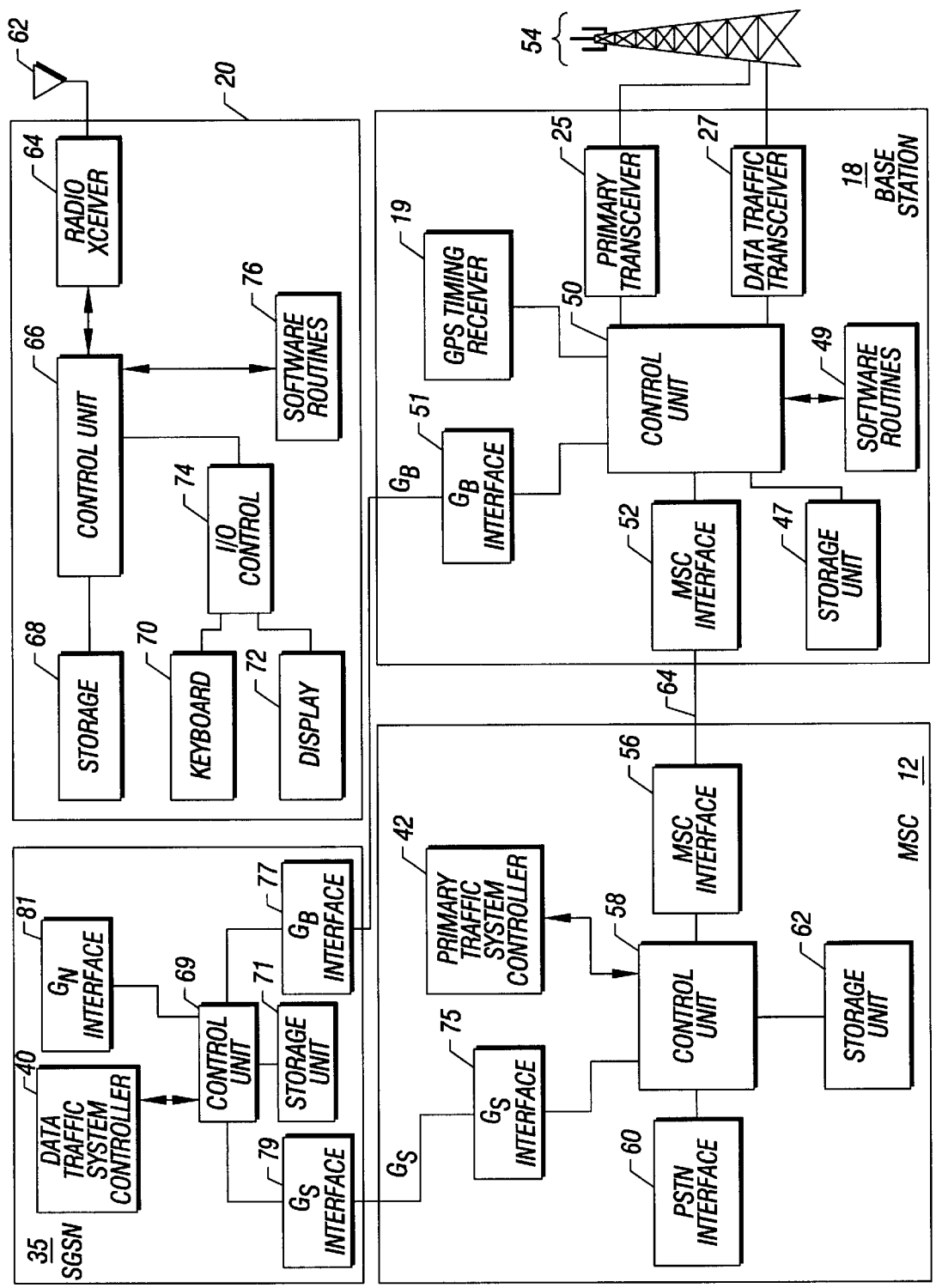
FIG. 1B is a block diagram of components in a mobile switching center (MSC), a base station, a data traffic service node, and a mobile unit in the mobile communications system of FIG. 1A.

Referring to FIG. 1B, components of the MSC 12, a base station 18, the data traffic service node 35, and a mobile unit 20 are illustrated. In the base station 18, the primary traffic transceiver 25 and packet data traffic transceiver 27 are connected to an antenna tower 54 that transmits and receives the first and second sets of carriers 26 and 28. The primary traffic and packet data traffic transceivers 25 and 27 are connected to a control unit 50, on which various software routines 49 may be executable. A storage unit 47 may also be connected to the control unit 50. Also connected to the control unit 50 is a GPS timing receiver or other synchronization circuit 19 that allows synchronization of all base stations in the group of cells 14 controlled by the MSC 12 and data traffic service node 35. Further, the base station 18 includes an MSC interface 52 that is coupled to a link 64 (e.g., a T1 link) that is in turn coupled to an interface unit 56 in the MSC 12. The base station 18 also includes an interface 51 (which in one embodiment is a $G_b$ interface 51 according to GPRS) for communicating over a link (e.g., a $G_b$ link) to the data traffic service node 35.

In the MSC 12, a control unit 58 provides the processing core of the MSC 12. The control unit 58 may be implemented with computer systems, processors, and other control devices. The control unit 58 is connected to a storage unit 62, which may contain one or more machine-readable storage media to store various data as well as instructions of software routines or modules that are loadable for execution by the control unit 58. For example, routines or modules that make up the primary traffic system controller 42 may be stored in the storage unit 62 and loaded for execution by the control unit 58. The MSC 12 may also include a PSTN interface 60 that is coupled to the PSTN 16 to allow communications with a PSTN-connected unit. Further, the MSC 12 includes an interface 75 (e.g., a $G_s$ interface) for communicating over a link (e.g., a $G_s$ link) to the data traffic service node 35.

The data traffic service node 35 includes interface units 77 and 79 for communicating over the $G_b$ and $G_s$ links, respectively, in one embodiment. The processing core of the data traffic service node 35 includes a control unit 69, which may be implemented with computer systems, processors, or other control devices. A storage unit 71 including machine-readable storage media is coupled to the control unit 69. Instructions associated with the routines and modules that make up the data traffic system controller 40 may be initially stored in the storage unit 71 and loaded by the control unit 69 for execution. The data traffic service node 35 further includes an interface 81 (e.g., a $G_n$ interface) for communicating with the GGSN 36 (FIG. 1A). In another embodiment, the interface 81 may be a network interface controller or other transceiver capable of communicating over the data network 32. In further embodiments, the data traffic and primary traffic system controllers 40 and 42 may be implemented in one platform and executable by the same control unit.

Carriers are communicated between the antennas 54 coupled to the base station 18 and an antenna 62 of a mobile unit 20. In one example arrangement of the mobile unit 20, one or more radio transceivers 64 are connected to the antenna 62 to send and receive packet data carriers and primary traffic carriers. A control unit 66 (or one or more other suitable control devices) may be coupled to the one or more radio transceivers 64. The control unit 66 is coupled to a storage unit 68, which may be in the form of a non-volatile memory (such as a flash memory or an electrically erasable and programmable read-only memory) and/or dynamic and static random access memories (DRAMs and SRAMs). Instructions of software routines 68 executable on the control unit 66 may be initially stored in a non-volatile portion of the storage unit 68. An input/output (I/O) controller 74 is coupled to the keyboard 70 and display 72 of the mobile unit 20.

The primary traffic system controller 42 in the MSC 12, the software routines 49 in the base station 18, software routines 76 in the mobile unit 20, and the data traffic system controller 40 in the data traffic service node 35 may be executed on respective control units. Control units may include microprocessors, microcontrollers, processor cards (including one or more microprocessors or microcontrollers), or other control or computing devices. The instructions of such software routines or modules may be stored in respective storage units each including one or more machine-readable storage media. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). The instructions when executed and loaded by respective control units cause the respective systems or devices to perform programmed acts.

The instructions of the software routines or modules may be loaded or transported into each respective system in one of many different ways. For example, code segments or instructions stored on floppy disks, CD or DVD media, a hard disk, or transported through a network interface card, a modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments or instructions to the respective system or device. Such carrier waves may be in the form of electrical, optical, acoustical, electromagnetic, or other types of signals.

Figure 1C:
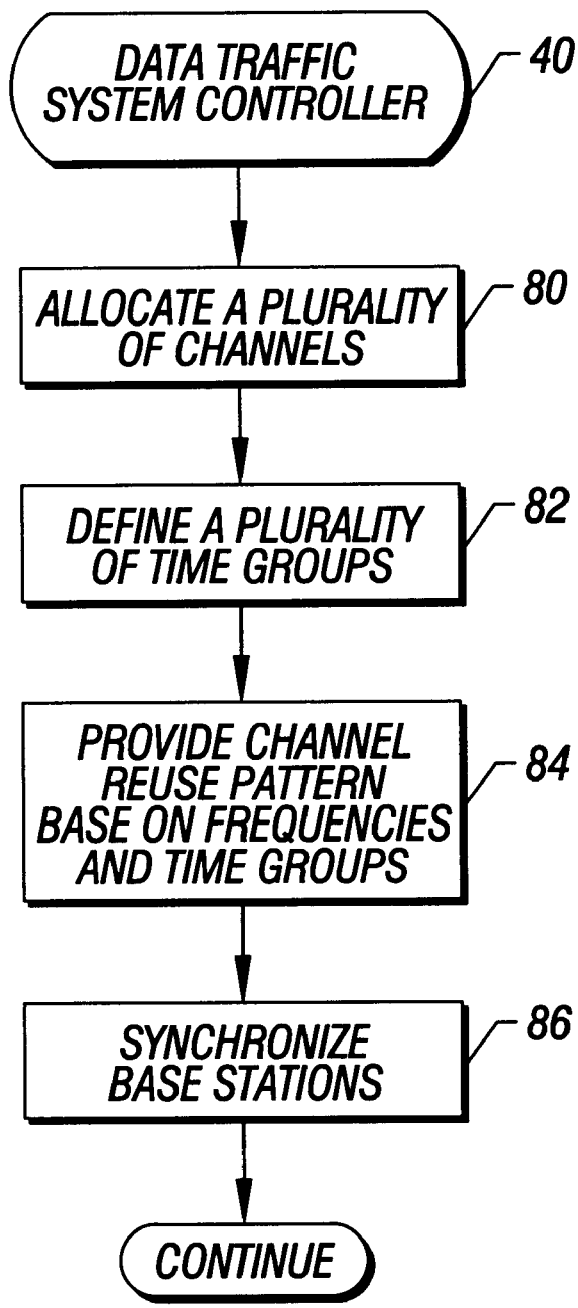
FIGS. 1C and 1D are flow diagrams of tasks performed by a data traffic system controller in the data traffic service node of FIG. 1B.

Referring to FIG. 1C, tasks performed by the data traffic system controller 40 in the data traffic service node 35 to set up the higher effective channel reuse padder for the packet data link are illustrated. First, the data traffic system controller 40 allocates (at 80) a predetermined number of channels. In one embodiment, three main carriers having frequencies F1, F2, and F3 are allocated one to each sector of each cell 14. Next, the data traffic system controller 40 defines (at 82) a plurality of time groups. In one embodiment, three time groups T1, T2, and T3 may be defined. In another embodiment, four time groups T1, T2, T3, and T4 may be defined. Based on the carrier frequencies F1–F3 and time groups T1–T3 or T1–T4, the data traffic system controller 40 provides (at 84) a channel reuse pattern for communications over the packet data link. Further, based on synchronization information received by the synchronization circuit 19 (which may include a GPS timing receiver), the data traffic system controller 40 may synchronize (at 86) the timings of signal transmissions and receptions of control signaling in base station 18 in all the cells 14 so that they are aligned in time.

Figure 1D:
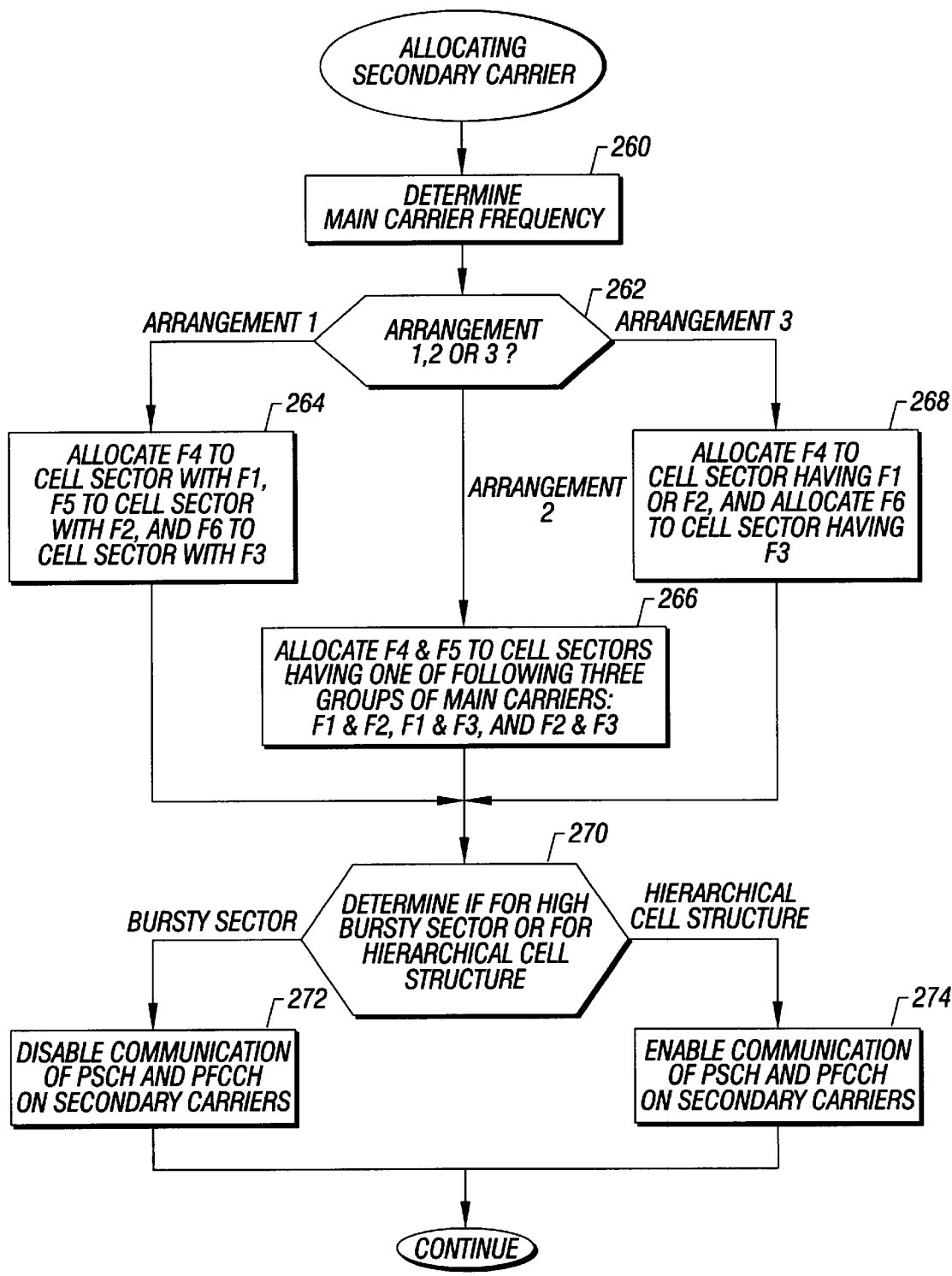

Referring to FIG. 1D, if additional capacity is needed in any one given cell sector, such as in a region having high bursty conditions or in a region with a hierarchical cell structure, a secondary carrier may be allocated by the data traffic system controller 40 in the data traffic service node of 35. The data traffic system controller 40 first determines (at 260) the main carrier frequency of the given cell sector. Next, the system controller 40 determines (at 262) which of the three arrangements is implemented: arrangement 1 (three high capacity sectors are present in one cell); arrangement 2 (two high capacity sectors are present in one cell); and arrangement 3 (one high capacity sector is present in one cell). If arrangement 1 is implemented, then the secondary carrier F4 is allocated (at 264) to the cell sector with the main carrier F1, the secondary carrier F5 is allocated to the cell sector with the main carrier F2, and the secondary carrier F6 is allocated to the cell sector with the main carrier F3.

However, if arrangement 2 is implemented, then carriers F4 and F5 are allocated (at 266) to cell sectors having one of the following three groups of main carriers: F1 and F2, F1 and F3, and F2 and F3. If arrangement 3 is implemented, then the system controller 40 allocates (at 268) the secondary carrier F4 to a cell sector having a main carrier F1 or F2, or alternatively, the system controller 40 allocates the secondary carrier F6 to a cell sector having main carrier F3.

Next, the system controller 40 determines (at 270) if the high capacity sector is one having a high bursty condition or one with a hierarchical cell structure. If the high capacity cell sector is a high bursty cell sector, then communication of control signaling for selection and reselection on the secondary carrier is disabled (at 272). However, if the high capacity sector includes a hierarchical cell structure, then communication of the selection and reselection signaling is enabled (at 274) on the secondary carrier.

The control channels employed in the packet data link include packet broadcast control channels (PBCCH), packet common control channels (PCCCH), and packet data traffic channels (PDTCH). The broadcast control channels PBCCH, communicated downlink (from base station to mobile unit), provide general information on a per base station basis (e.g., cell/sector specific information) including information employed for mobile units 20 to register in the system 10. The common control channels PCCCH carry signaling information used for access management tasks (e.g., allocation of dedicated control channels and traffic channels). PCCCH includes a packet paging channel (PPCH) and a packet access grant channel (PAGCH) for downlink communications, and PCCCH includes a packet random access channel (PRACH) for uplink communications (mobile unit to base station). PRACH is used by a mobile unit 20 to request access to the system 10. PPCH is used by the base station 18 to alert a mobile unit 20 of an incoming call. PAGCH is used to allocate a channel to a mobile unit 20 for signaling to obtain a dedicated channel following a request by the mobile unit 20 on PRACH. Other control channels include a packet frequency correction channel (PFCCH) and a packet synchronization channel (PSCH). PFCCH and PSCH are used to synchronize a mobile unit 20 to the time slot structure of each cell by defining the boundaries of burst periods and time slot numbering. PSCH is used for selection while PFCCH is used for reselection. In one embodiment, the control channels discussed above may be extensions of circuit-switched logical channels used in a GSM system.

The control channels that are communicated with the higher effective 3/9, 4/12, or other channel reuse pattern include PBCCH, PCCCH, PFCCH, and PSCH. The data traffic channels PDTCH and associated traffic control channels, PTCCH (packet timing advance control channel) and PACCH (packet associated control channels) use the 1/3 reuse pattern, since traffic channels employ various mechanisms, as noted above, to better withstand interference from neighboring cell segments.

Figure 12:
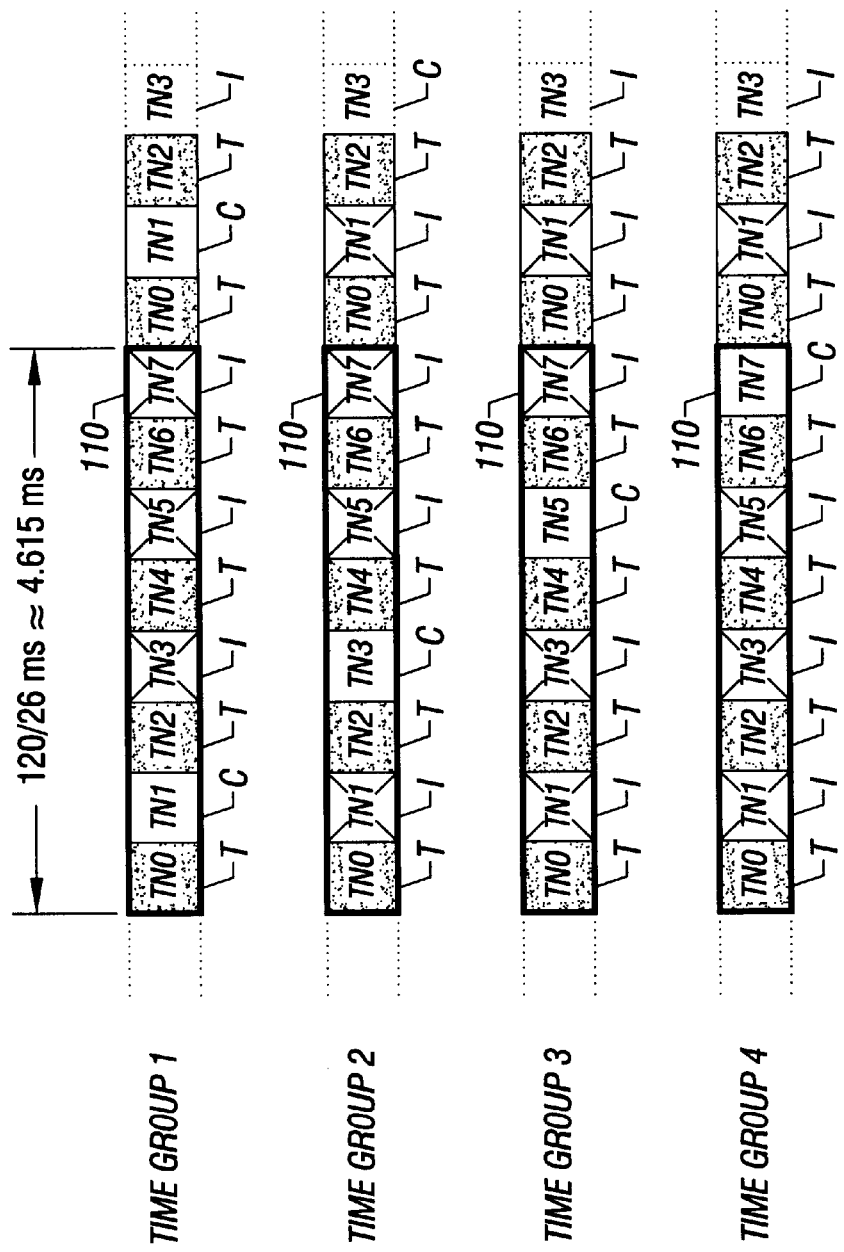

Referring to FIG. 12, each main or secondary carrier (F1, F2, F3, F4, F5, or F6) in the packet data link carries a TDMA frame 110 that is divided into a plurality of time slots. In the illustrated embodiment, eight time slots (or burst periods) TN0–TN7 are used. However, in further embodiments, a carrier may be divided into a smaller or larger number of time slots. In one embodiment, each TDMA frame 110 is structured like a GSM frame and has a length of 120/26 ms (or about 4.615 ms). To provide an effective 4/12 reuse pattern, control channels are staggered across four different time groups. In the illustrated embodiment, in time group 1, control channels (PBCCH, PCCCH, PFCCH, and PSCH in one embodiment) are transmitted during time slot TN1; in time group 2, control channels are transmitted in time slot TN3; in time group 3, control channels are transmitted during time slot TN5; and in time group 4, control channels are transmitted during time slot TN7. By staggering the control channels into different time slots as illustrated, a channel reuse pattern may be divided according to both frequency and time. More generally, in each time group, control signaling may be carried in at least one time slot (less than all the time slots) provided that different sub-groups of time slots are used in different time groups.

As illustrated in FIG. 12, the time slots are marked as one of a T time slot (during which packet data traffic may be communicated), a C time slot (during which control signals may be communicated), and an I time slot (during which all traffic and control channels may be idle in blocks that transmit PBCCH and PCCCH on other time groups but which transmit packet data traffic otherwise, as explained below in connection with FIGS. 16A, 16B and 17). In one embodiment, a block includes four frames of a multiframe (e.g., a 51- or 52-frame multiframe).

Figure 13:
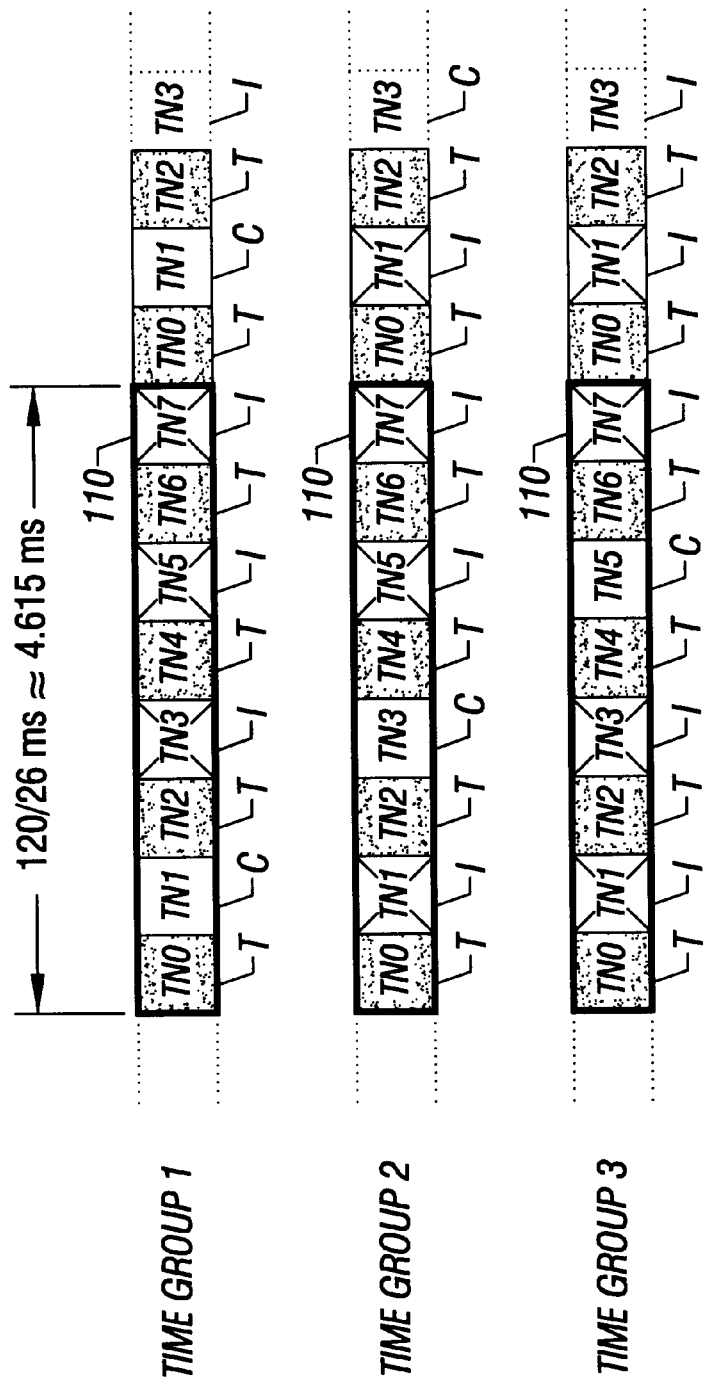

Referring to FIG. 13, in an effective 3/9 reuse pattern including three time groups T1, T2 and T3, the control channels are placed in time slot TN1 (in time group T1), time slot TN3 (in time group T2), and time slot TN5 (in time group T3). The time slots that carry control channels are indicated as being C time slots. Also illustrated in FIG. 13 are T time slots (during which packet data traffic may be transmitted) and I time slots (which are idle during blocks that transmit PBCCH or PCCCH in other time groups but which carry packet data traffic otherwise).

In further embodiments, the control channels may be carried in time slots other than TN1, TN3, TN5 or TN7 (FIG. 12) or TN1, TN3, or TN5 (FIG. 13). For example, instead of placing control channels in odd time slots TN1, 3, 5 and 7, the control channels may be placed in time slots TN0, TN2, TN4, and TN6 in the different time groups. Other staggering schemes may also be employed, with some control channels communicated in even time slots and others communicated in odd time slots, for example. Referring to the example of FIG. 14, which shows a 3/9 reuse pattern, control channels may be placed in the C time slots: time slot TN0 in time group 1, time slot TN2 in time group 2, and time slot TN4 in time group 3. The T time slots carry data traffic, and the I time slots are idle during blocks that transmit PBCCH or PCCCH in other time groups but carry packet data traffic otherwise. With larger or smaller numbers of time slots, other staggering schemes can be provided to provide fewer or larger numbers of time groups.

Each base station 18 and mobile unit 20 uses a time group number (TG) to indicate the time group the base station 18 and mobile unit 20 is in. The TG number may be carried in the PSCH and PFCCH bursts. In one embodiment in which time slots TN1, 3, 5, and 7 correspond to time groups 1, 2, 3, and 4, the following values of TG indicate the time slot to be used for carrying control channels.

| TG | TN |
|----|----|
| 0  | 1  |
| 1  | 3  |
| 2  | 5  |
| 3  | 7  |

Figure 16A:
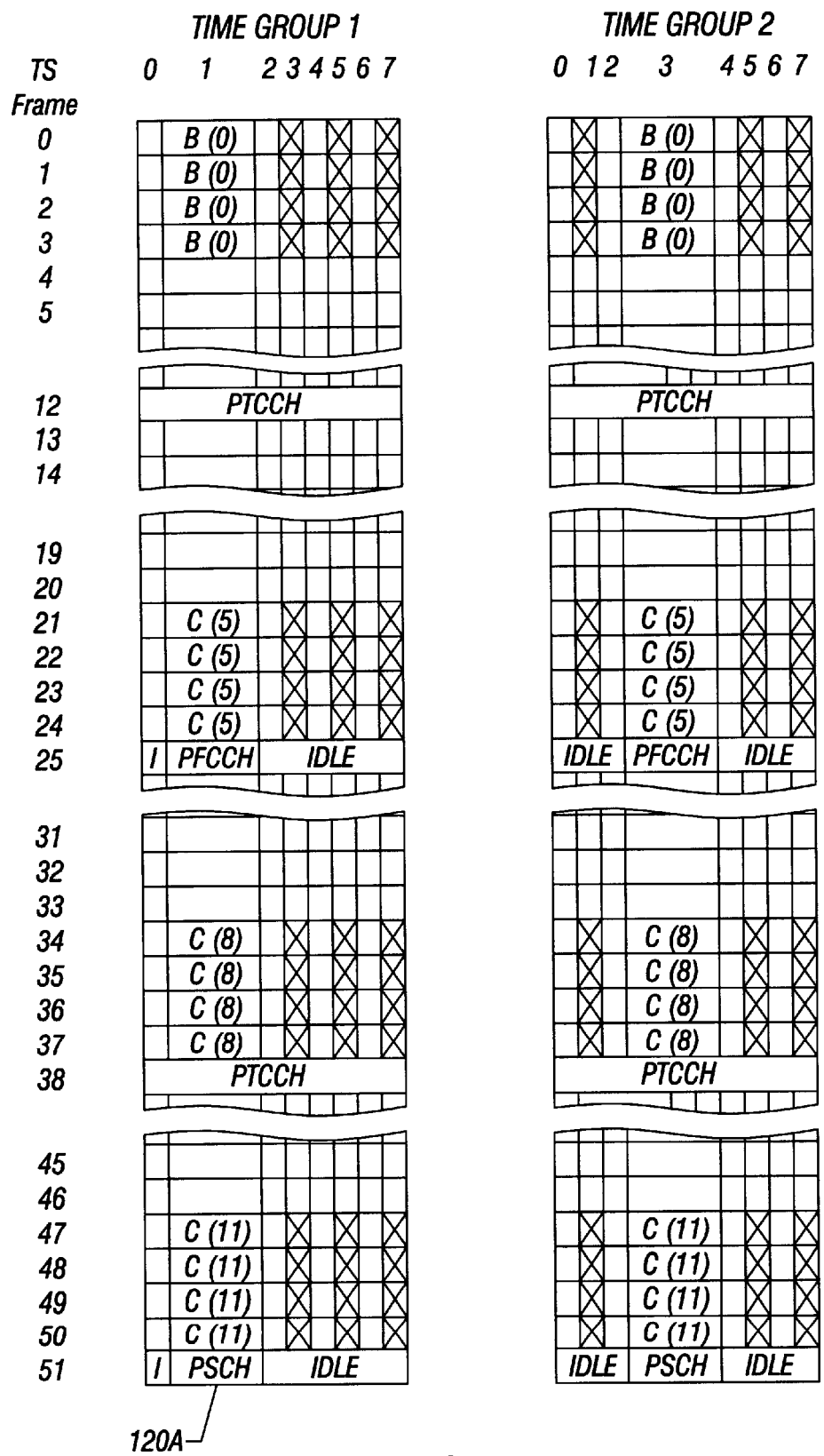
FIGS. 16A, 16B and 17 illustrate multiframes in several time groups in accordance with some embodiments for carrying data traffic and control signaling in the packet-switched data link.
Figure 16B:
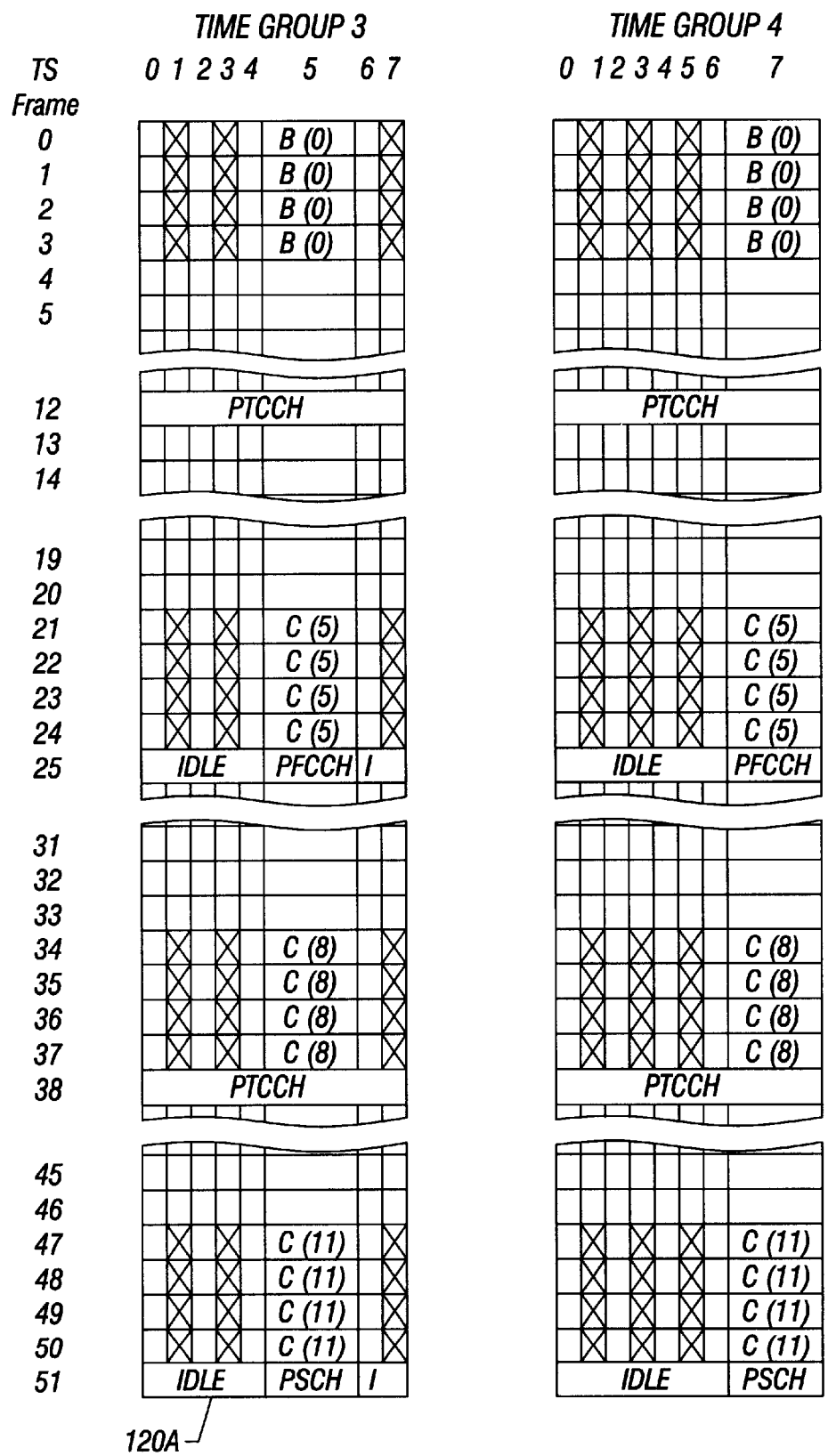
Figure 17:
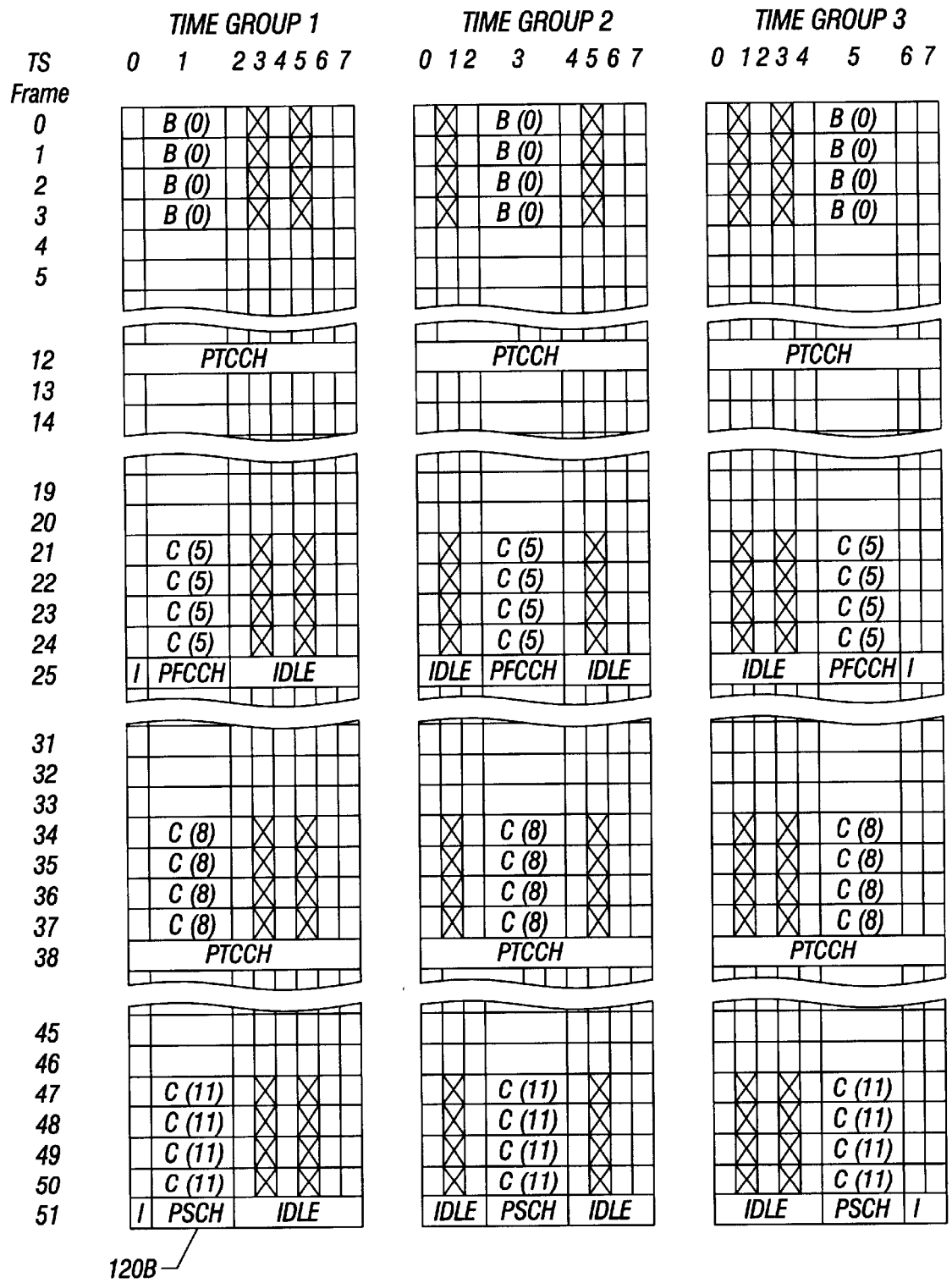

Referring to FIGS. 15–17, communication using 52-frame multiframes 120 in accordance with some embodiments is illustrated. The structure of a multiframe 120 is illustrated in FIG. 15. Each multiframe 120 includes 52 TDMA frames (FRN 0–51), which are divided into 12 blocks B0–B11, leaving four frames FRN 12, 25, 38, and 51 to carry predetermined channels. In further embodiments, other multiframe structures may be used, such as a 51-frame multiframe. For each time group (1, 2, 3, or 4), the eight columns of the multiframe 120 correspond to the eight time slots TN0–TN7, and the 52 rows correspond to the 52 frames of the multiframe 120. FIGS. 16A and 16B illustrate a multiframe structure 120A employing an effective 4/12 reuse pattern, and FIG. 17 illustrates a multiframe structure 120B employing an effective 3/9 reuse pattern.

In the illustrated examples of FIGS. 16A, 16B, and 17, three blocks of each multiframe are assigned to PCCCH (frames containing a C) and one block is assigned to PBCCH (frames containing a B). A block includes four TDMA frames. The number of blocks allocated for PBCCH and PCCCH is flexible, from two up to 12 blocks per time slot in each multiframe 120. In the illustrated examples, PBCCH is carried in block B0, and PCCCH is carried in blocks B5, B8, and B11. Frames FRN 25 and 51 carry PFCCH and PSCH, respectively, and frames FRN 12 and 38 carry PTCCH.

Frames marked with an "X" are idle, and correspond to the odd time slots (TN1, TN3, TN5, or TN7) in blocks (0, 5, 8, and 11) that carry control channels PBCCH and PCCCH in other time groups. Thus, for example, the frames in block B0 in time slot TN3 in each of time groups 1, 3, and 4 are idle because the frames in time slot TN3 of time group 2 carries PBCCH. The same is true also for frames in blocks B5, B8, and B11 in time slots TN1, 3, 5, or 7 that do not carry control signaling.

The illustrated multiframes 120A and 120B may be the multiframes carried on the main carrier (F1, F2, or F3) of a high bursty sector. In multiframes carried by a secondary carrier (F4, F5, or F6), the PBCCH, PCCCH, and PTCCH may be assigned to the same frames. The same number of PCCCH frames may be present in the multiframes carried by the main and secondary carriers. A multiframe carried by a secondary carrier in a high bursty sector does not contain PSCH and PFCCH, which are used for selection and reselection, respectively. However, in a hierarchical cell sector, both the main and secondary carriers carry PSCH and PFCCH in respective multi frames.

By assigning the same number of control channels and placing them in the same frames, the problem of adjacent channel interference between a frame carrying traffic (PDTCH) and a frame carrying a control channel, such as PBCCH or PCCCH, can be avoided. For example, if the number of PCCCH frames on a secondary carrier F4 is greater than the number of PCCCH frames on the main carrier F3, then adjacent channel interference between an extra PCCCH frame of the secondary carrier F4 and a traffic frame (PDTCH) on the main carrier F3 (in a neighboring cell sector) may occur. The same may occur between carriers F1 and F6 and between carriers F4 and F5. Generally, this may be true in any scenario where a control channel (e.g., PBCCH or PCCCH) is placed in a frame or block that differs from an adjacent carrier.

Figure 18:
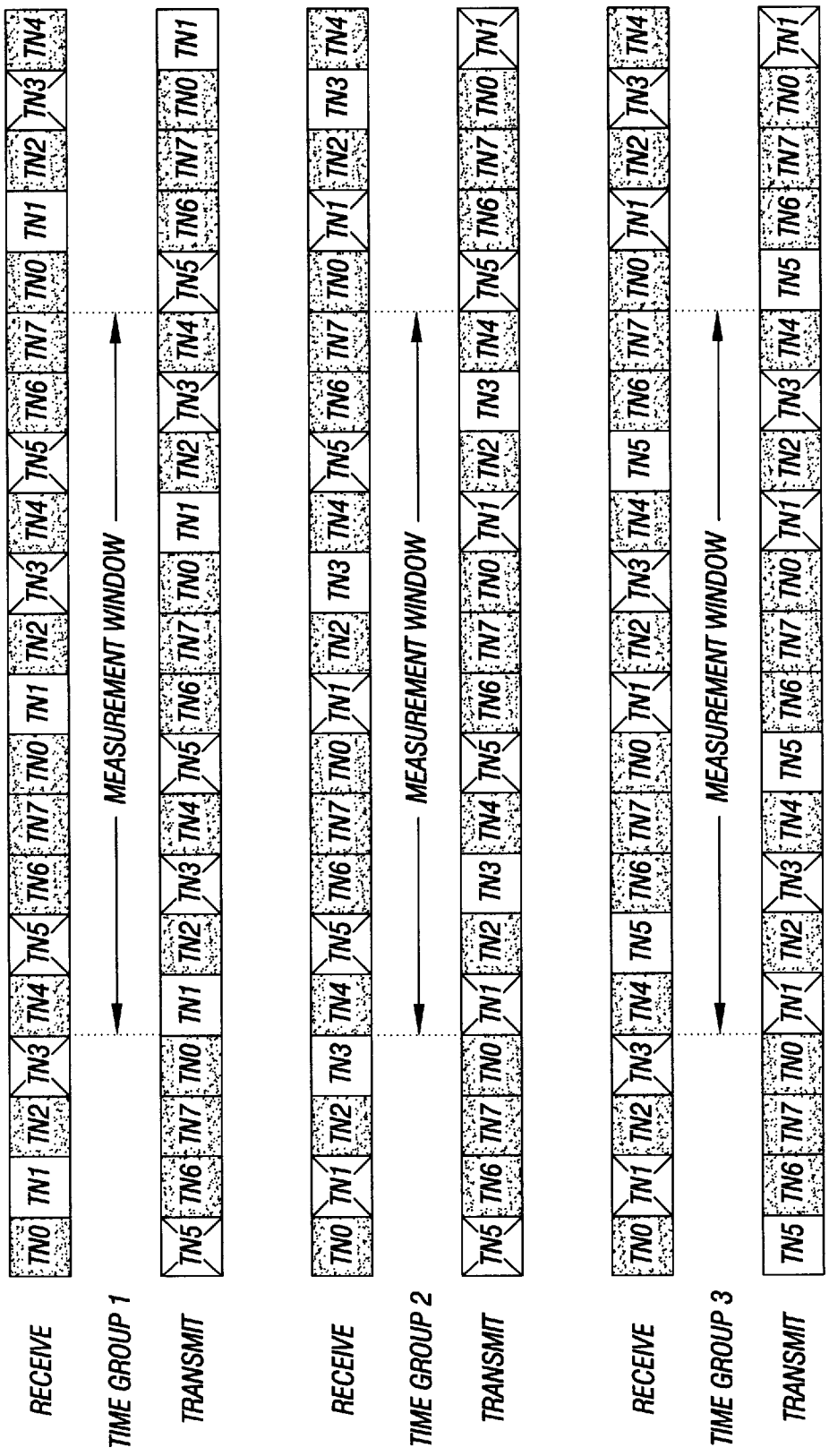
FIG. 18 illustrates TDMA frames for carrying data traffic and control signaling in transmit and receive paths of the packet-switched data link.

Referring to FIG. 18, the receive (downlink) and transmit (uplink) paths are illustrated. A measurement window is defined during which a mobile unit 20 can measure either PSCH (for cell sector selection) or PFCCH (for cell sector re-selection). The measurement window in this example is for a mobile unit that is active on time slot TN0. With other arrangements, the measurement window begins and ends at different time slots.

The time slots between the receive and transmit path are out of phase by three time slots. If time group T1 is selected for control signaling, then time slot TN1 may be the one used to carry PSCH or PFCCH. For time group T1, in this example, the time slots TN0 and TN2–TN7 are idle in frame FRN 25 (which carries PFCCH) and frame FRN 51 (which carries PSCH).

Thus, during the measurement window, a first mobile unit can measure PSCH or PFCCH (on the downlink path) in time slot TN1 (if time group T1 has been selected, based on the value of TG). However, during receipt of PSCH or PFCCH in time slot TN1, a second mobile unit (in a neighboring cell sector) may be transmitted traffic in time slot TN6. Transmission of such traffic in TN6 by the second mobile unit may interfere with the measurement of PSCH or PFCCH by the first mobile unit. Thus, effectively, the mobile unit may not be able to "see" all time groups due to such interference. To get around this problem, a time group rotation scheme may be employed, in which the value of TG is rotated through 0, 1, 2, and 3 at predetermined time points. By rotating the value of TG, the time group used for carrying control channels may be rotated in any given cell sector. Thus, if a mobile unit misses a control signal in one time group, it may be able to see the control signal when the cell sector rotates to another time group.

Rotation of time groups occur concurrently in all the base station sites so that division of time groups among the sectors is maintained. Rotation may be accomplished by updating the value of TG with each new occurrence of a multiframe. The value of TG may be rotated with each increment of a predetermined parameter MFN, which represents the multiframe number that ranges between zero and three. MFN is calculated from the TDMA frame number FRN according to the following:

$$MFN=(FRN+52) \bmod 4.$$

With each increment of MFN, the value of TG is rotated to rotate the time group assigned to each cell sector. In one embodiment, the time group rotation may occur between frame numbers (FRN) mode 52 equal to 3 and 4.

If secondary carriers are also present in a high capacity sector, the time group rotation for the secondary carriers are synchronized with the group rotation for the main carriers.

A mobile communications system has been described that allows for expanded carrier capacity by use of secondary carriers. Thus, for example, the secondary carriers may be allocated to sectors in which high bursty conditions are present to enable the addition of control bursts, such as PCCCH bursts, to handle the added call setup and termination load. Also, if a hierarchical cell structure is desired, additional layers may be added to predetermined sectors. A hierarchical cell structure allows a cell sector to handle increased capacity during high usage periods. Further, a hierarchical cell structure allows for the segregation of different groups of users.

Because the base stations 18 are time synchronized for the packet data link, path delays due to relatively large cells (cells of greater than a predetermined size) may potentially cause problems for the effective 3/9 or 4/12 channel reuse pattern. Because of path delays in relatively large cells, time slots of neighboring cell sectors, as received by a mobile unit, may start overlapping with each other. A mobile unit 20 monitors signal strengths of control signals from a group of neighboring cell sectors to select or reselect the cell sector providing the strongest signal strength. However, because the mobile unit 20 may be located closer to a first base station 18 than a neighboring base station 18, propagation delays due to distances involved in relatively large cells can cause overlap of packet data traffic and control signals in different time slots of the first and neighboring base stations, which may violate the requirement that the time slots be aligned due to inter-base station synchronization.

To address this issue, predetermined time slots are employed for carrying control channels, including PSCH and PFCCH, which are used to perform cell selection and reselection. By using the predetermined time slots of a TDMA frame to carry control signaling, the guard period between packet data traffic channels and the control channels may be increased to provide superior protection in relatively large cells.

As a mobile unit 20 moves in a cell sector or between cell sectors, it continues to monitor PSCH and PFCCH from neighboring cell sectors to allow the mobile unit 20 to select or reselect the strongest signal. The mobile unit 20 accomplishes this by measuring the PSCH and PFCCH bursts during predetermined frames. The measurement is made during the mobile unit's data measurement period (also referred to as the measurement window) of all neighboring cells.

Figure 19:
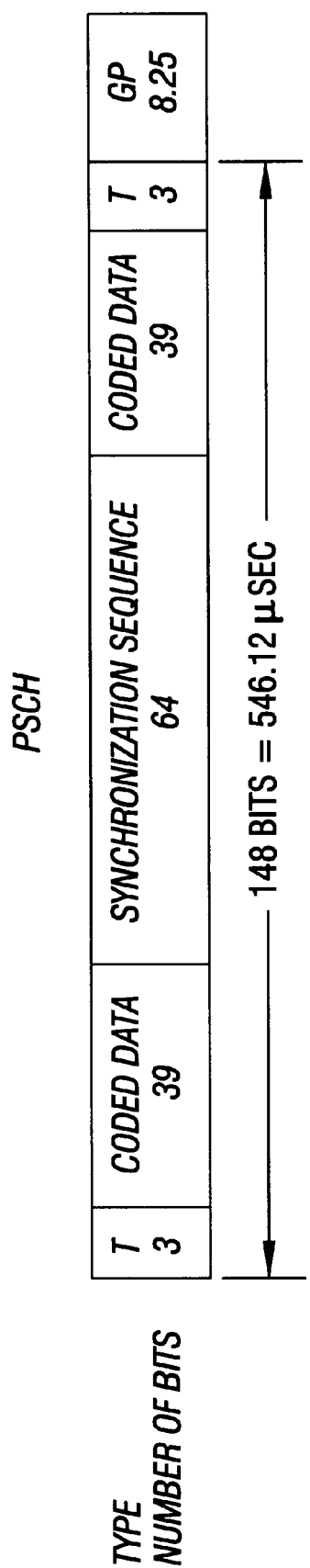
FIG. 19 illustrates a synchronization burst for use in the packet-switched data link.

Theoretically, for a normal interference case, the frequency reuse distance $D_R$ for a cell can be expressed as $$D_R = \sqrt{3NR},$$

where N is the frequency reuse pattern and R is the cell radius. Thus, for N having the value 1 (a 1/3 frequency reuse pattern), the value of $D_R$ is 1.73R. Referring to FIG. 19, a PSCH burst is illustrated. In one embodiment, the PSCH burst is 148 bits long plus a guard period (GP) of 8.25 bits (symbols). The PFCCH burst also has the same length as the PSCH burst and is also associated with a guard period of 8.25 bits. Other control channel bursts including PBCCH and PCCCH have the same length and guard period. However, the internal structures of PFCCH, PBCCH, and PCCCH differ from that of PSCH as illustrated in FIG. 19.

Since the duration of a single bit is approximately 3.69 microseconds ($\mu$sec) in one embodiment, the guard period (GP) is about 30.44 $\mu$sec in length. This translates into approximately 9 kilometers (km). Using the above equation, in which $D_R$ is equal to about 9 km, the estimated maximum cell size (defined by its radius) is approximately 5 km, much less than cell sizes supported by GSM or TIA/EIA-136. Thus, a large cell according to one example embodiment may be defined as a cell of greater than approximately 5 km (the maximum cell size supported). In further embodiments, a large cell may be defined to be larger than other predetermined sizes.

As discussed above, to provide for higher effective reuse patterns, sectors are divided according to both frequency and time. In one embodiment, the PSCH bursts may be placed in the even time slots (TN0, TN2 or TN4) for an effective 3/9 reuse or TN0, TN2, TN4, TN6 for an effective 4/12 reuse. Thus, referring to FIG. 10, each cell 14 includes three sectors that have been divided into three separate time groups as well as three separate frequencies. In one embodiment, in time groups T1–T3, control channels are carried in time slots TN0, TN2, and TN4, respectively, of each TDMA frame. FIG. 14 illustrates placement of control channels including the PSCH and PFCCH bursts in time slots TN0, TN2 and TN4 in an effective 3/9 channel reuse pattern.

The following describes an example of how overlapping of packet data traffic channels PDTCH and control channels (including PBCCH and PCCCH) may occur. As shown in FIG. 14, in time groups 1, 2, and 3, packet data traffic can be transmitted in time slot TN7 (indicated as 212, 216, and 218). In time group 1, time slot TN0 (indicated as 214) carries control channels, including the PSCH and PFCCH bursts (in respective frames of the multiframe structure). As illustrated in FIG. 10, a sector 210 is in a cell that has a neighboring cell with sectors 220 and 222 that are both allocated frequency F1. However, the sectors 210, 220, and 222 are in different time groups, with control channels being in time slot TN0 in the sector 210, time slot TN2 in the sector 220, and time slot TN4 in the sector 222. A mobile unit 20 in the sector 210, for example, may be measuring PSCH bursts in time slot 214 (TN0). However, due to propagation delays in a relatively large cell the packet data traffic being transmitted in time slot 216 (TN7) of sector 220 or time slot 218 (TN7) of sector 222 may start to slide into time slot TN0 of sector 210. The packet data traffic in TN7 is being communicated in the previous frame. Thus, for example, if frame FRN 51 is used to carry PSCH in time slot TN0 in the sector 210, then packet data traffic in frame FRN 50 in time slot TN7 (in sectors 220 and 222) may overlap into the measurement window for PSCH in TN0. Depending on the amount of overlap, this may degrade the control signaling in time slot TN0 of the sector 210.

Overlap of packet data traffic into control channels destroys the time division among the different sectors. Consequently, instead of an effective 3/9 reuse pattern as illustrated in FIG. 10, a 1/3 reuse pattern is provided which may cause unacceptable interference between control channels of different cell sectors. The likelihood of unacceptable overlap is increased as cells increase in size.

To overcome the problems associated with overlapping data traffic and control channel time slots according to some embodiments, control channels may be placed on odd time slots instead of even slots. For example, the control channels may be placed on time slots TN1, TN3, TN5 for an effective 3/9 channel reuse and on time slots TN1, TN3, TN5 and TN7 for an effective 4/12 channel reuse. By placing the control channels in odd time slots, a larger effective guard period can be provided. In accordance with this embodiment, the entire time slot TN0 can be used as a guard period to provide an effective guard period of 8.25 bits (GP from TN7 in the previous frame) plus 156.25 bits (period of TN0 plus GP). With the increased guard period, the maximum cell size supported by GSM (35 km) can be supported for high speed packet data transfers over the packet data link. Thus, although placing control signaling in even time slots TN0, TN2, TN4, and TN6 may advantageously provide for higher effective channel reuse for the control channels in normal cells (cells that are smaller than large cells), odd time slots may be used to carry control signals to provide for an increased guard period between packet data traffic and control signaling to maintain base station synchronization in large cells and therefore higher effective reuse patterns (e.g., 3/9, 4/12, and so forth).

Another concern in a system with relatively large cell sizes is the overlap of data traffic on PDTCH with PBCCH, PCCCH, and other control channels. For example, in the effective 4/12 channel reuse arrangement of FIGS. 16A and 16B, in blocks B0, B5, B8, and B11 which carry PBCCH and PCCCH, data traffic may be carried in the time slots (0, 2, 4, and 6) adjacent the odd time slots carrying PBCCH and PCCCH. In the effective 3/9 channel reuse arrangement of FIG. 17, data traffic may be carried in time slots (0, 2, 4, 6, and 7). With larger cells, overlap of time slots may cause interference of the data traffic and control signaling.

Figure 20A:
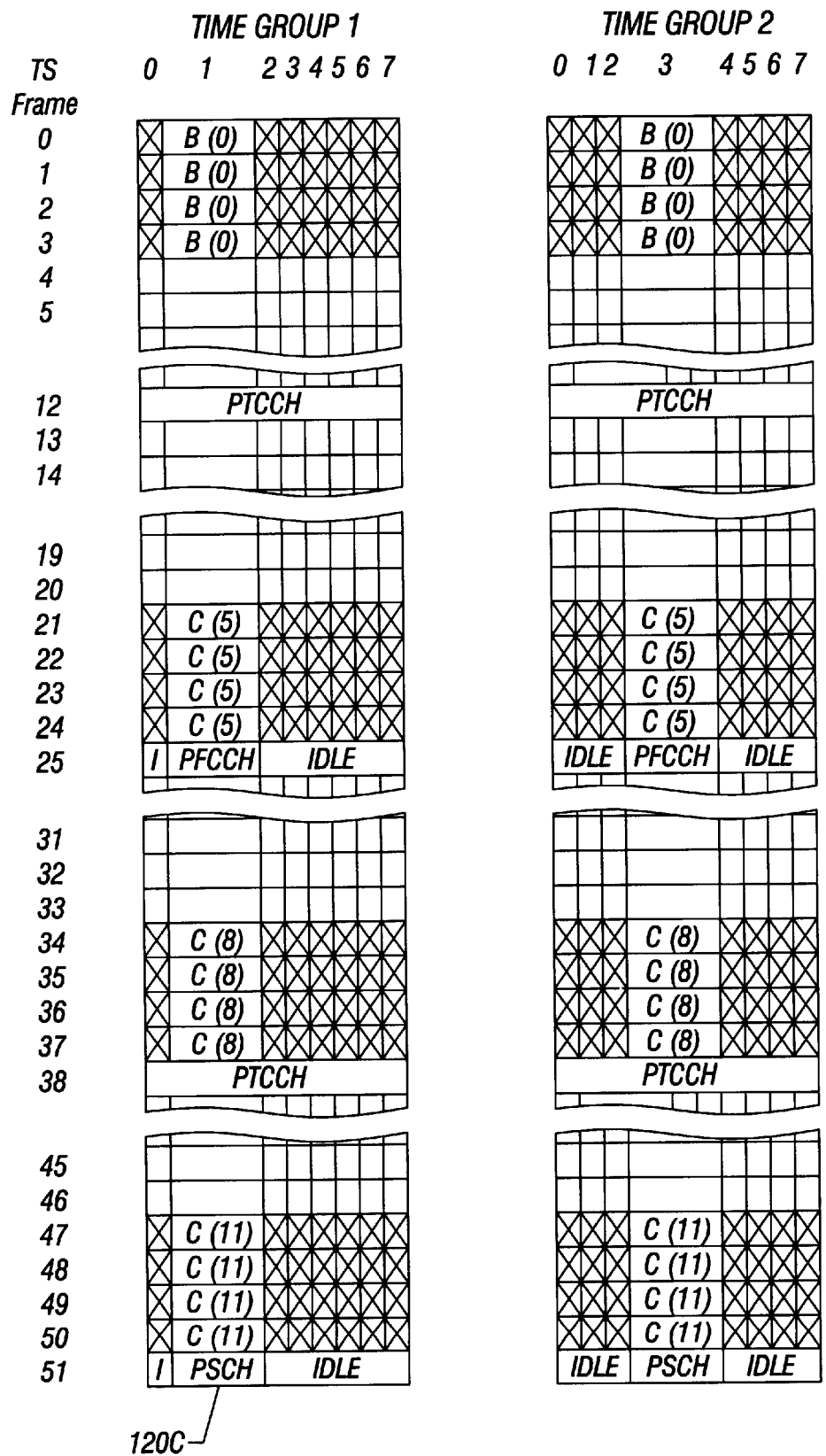
FIGS. 20A, 20B and 21 illustrate multiframes in accordance with further embodiments for use in large cells.
Figure 20B:
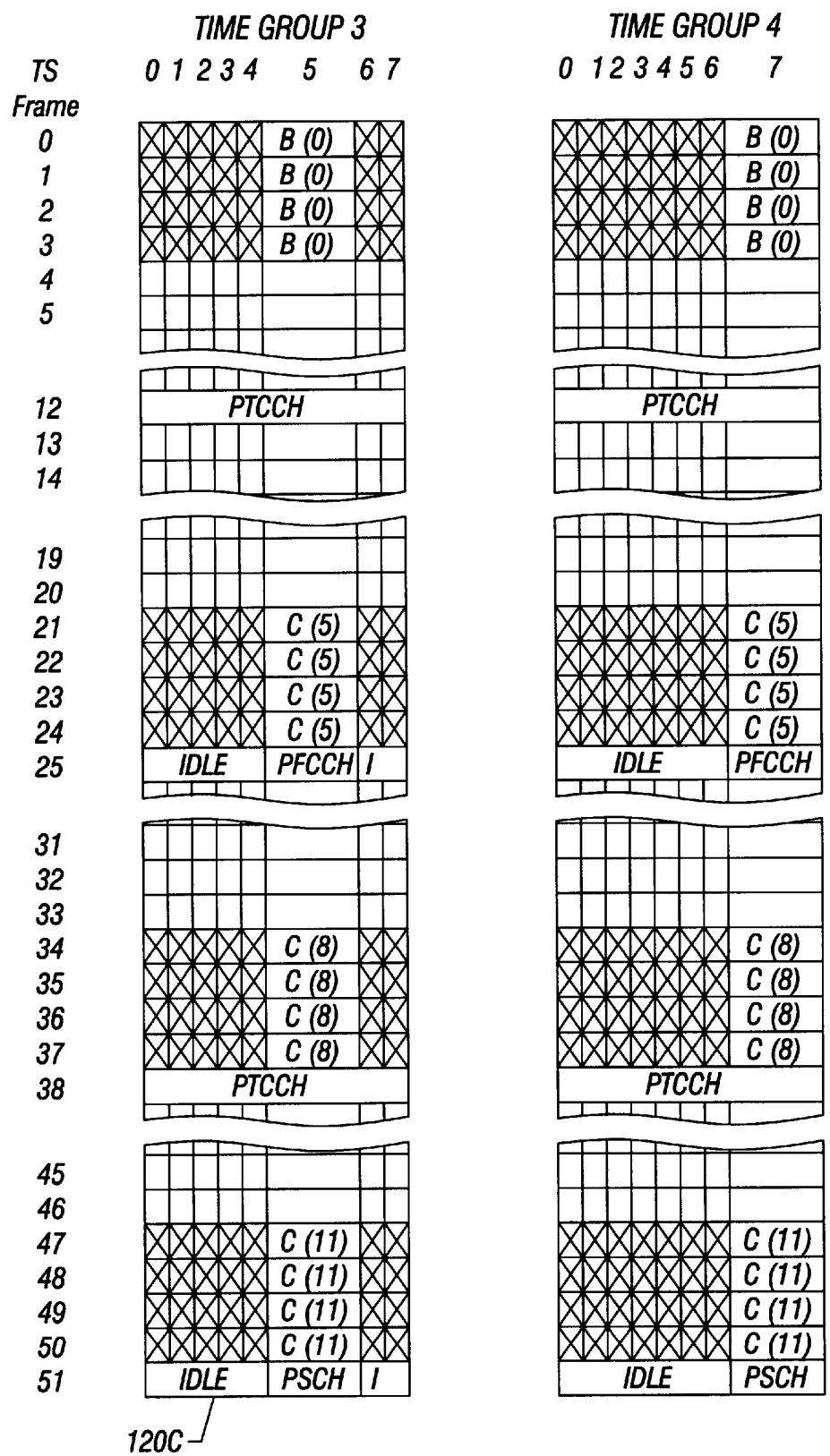
Figure 21:
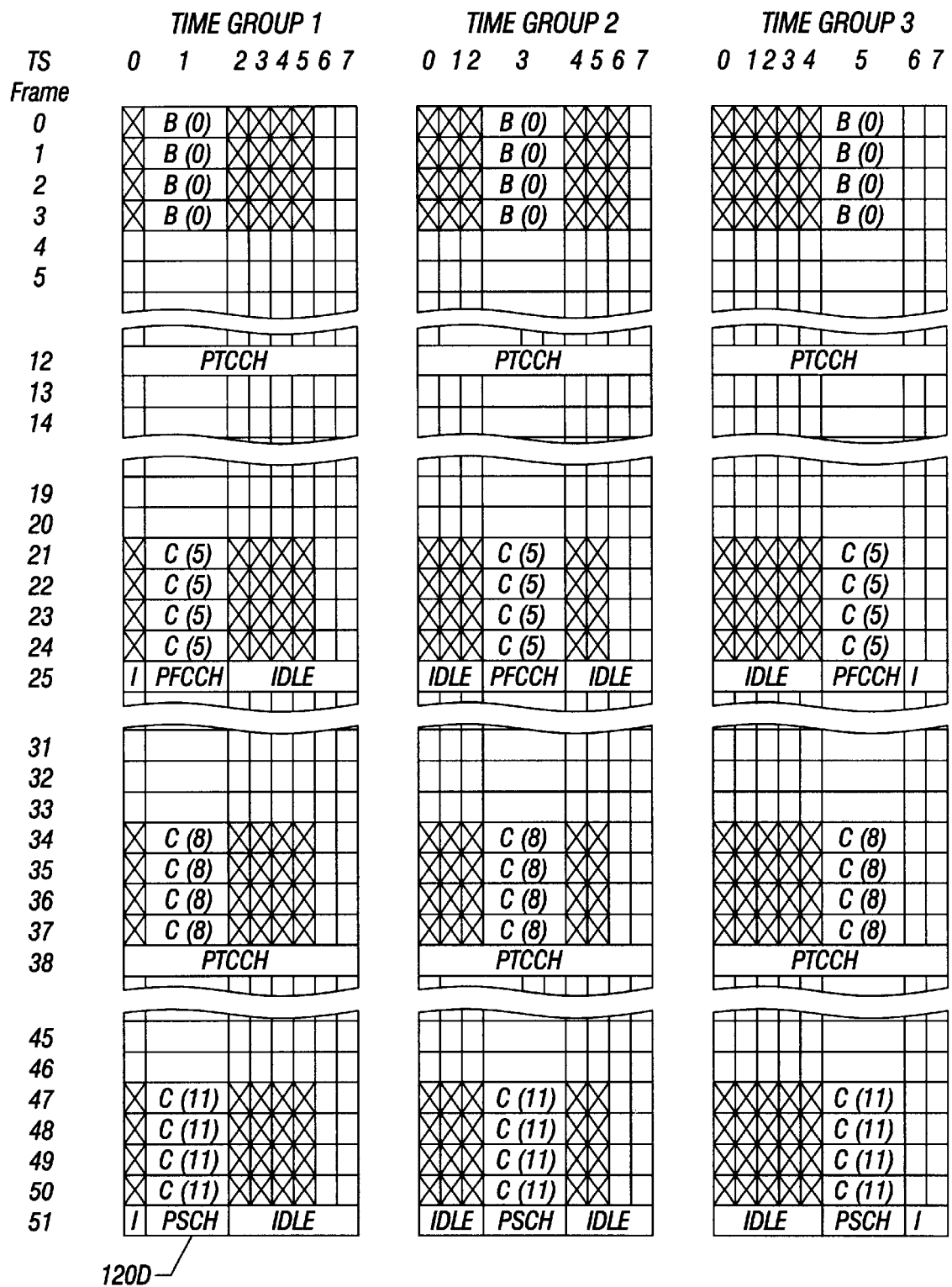

To rectify this problem in accordance with one embodiment, packet data traffic is removed from blocks carrying control channels PBCCH and PCCCH (e.g., B0, B5, B8 and B11) in time slots TN0, TN2 and TN4 in every sector for an effective 3/9 reuse pattern. Packet data traffic is removed from blocks carrying PBCCH and PCCCH on time slots TN0, TN2, TN4, and TN6 for an effective 4/12 reuse pattern. This is illustrated in FIGS. 20A, 20B, and 21, which show multiframes 120C and 120D for effective 4/12 and 3/9 channel reuse patterns, respectively, for use in large cells. As a result, blocks carrying PBCCH and PCCCH do not carry packet data traffic for large cells in the 4/12 multiframe structure 120C. In the effective 3/9 multiframe structure 120D of FIG. 21, time slots TN6 and TN7 in the blocks carrying PBCCH and PCCCH are allowed to carry packet data traffic, but blocks in time slots not carrying PBCCH or PCCCH are idle. This effectively provides an increased guard period of 8.25+156.25 bits for PBCCH and PCCCH in both the effective 3/9 and 4/12 channel reuse patterns since packet data traffic is not communicated before communication of PBCCH and PCCCH. A guard period greater than a time slot period is provided to protect PBCCH and PCCCH.

Other control channels, such as PTCCH, may also be similarly protected. For example, in FIGS. 20A, 20B, and 21, block B2 before frame FRN 12 carrying the first PTCCH may be set idle to protect PTCCH in frame number 12 of time slot TN0. Similar protection may be afforded PTCCH in frame FRN 38 if PCCCH in block 8 is moved elsewhere.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method of communicating in a mobile communications system including a plurality of cell segments, comprising:

providing a primary carrier in a first cell segment of the plurality of cell segments, the primary carrier carrying circuit switched traffic and control signaling;

providing a main data carrier for carrying packet data traffic and control signaling and for carrying control signaling defining cell segment selection and reselection for the plurality of cell segments;

providing a secondary data carrier carrying packet data traffic and control signaling; and wherein the secondary data carrier does not carry control signaling defining cell segment selection and reselection for the plurality of cell segments.

2. The method of claim 1, further comprising assigning a time group to the first cell segment, the time group including at least one time slot.

3. The method of claim 1, further comprising synchronizing time slots in the cell segment with the other cell segments.

4. The method of claim 1, further comprising providing another main carrier in a second cell segment without providing another secondary carrier.

5. The method claim 1, further comprising providing a fourth carrier in a second cell segment, the second cell segment having a smaller number of one or more carriers than the first cell segment.

6. The method of claim 5, further comprising identifying the first cell segment as a high bursty cell segment.

7. The method of claim 5, further comprising providing a hierarchical cell structure in the first cell segment.

8. The method of claim 1, wherein communicating in the mobile communications system is according to an Enhanced General Packet Radio Service protocol.

9. The method of claim 1, further comprising:

defining the first cell segment as a macrocell segment;

defining at least one microcell segment in the macrocell segment;

allocating the main carrier to the macrocell segment; and allocating at least one other carrier to the microcell segment.

10. A system for use in a mobile communications system having a first wireless link, comprising:

an interface to communicate signals over the first wireless link, the interface adapted to transmit and receive a first carrier and a second carrier;

wherein the first carrier carries packet based traffic; and a control unit adapted to communicate control signaling over the first carrier for performing cell selection for the first and second carriers and to communicate signaling over the second carrier, the signaling on the second carrier not including control signaling for performing cell selection.

11. The system of claim 10, further comprising a second interface to communicate signals over a circuit switched link including additional carriers.

* * * * *